(12) United States Patent
Simic et al.

(10) Patent No.: US 8,503,513 B2
(45) Date of Patent: Aug. 6, 2013

(54) SYSTEM AND/OR METHOD FOR DETECTING MULTI-TONE JAMMING

(75) Inventors: Emilija M. Simic, La Jolla, CA (US); Shiou-Hung Chen, San Diego, CA (US); Douglas Grover, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/310,535

(22) Filed: Dec. 2, 2011

(65) Prior Publication Data

US 2012/0076177 A1  Mar. 29, 2012

Related U.S. Application Data

(62) Division of application No. 12/111,101, filed on Apr. 28, 2008, now Pat. No. 8,094,702.

(51) Int. Cl.
*H04B 1/00* (2006.01)
(52) U.S. Cl.
USPC .......................................... 375/150
(58) Field of Classification Search
USPC .......................................... 375/150
See application file for complete search history.

(56) References Cited

U.S. PATENT DOCUMENTS

| 4,701,934 | A | 10/1987 | Jasper |
| 5,663,734 | A | 9/1997 | Krasner |
| 6,044,104 | A | 3/2000 | Watanabe |
| 6,366,599 | B1 | 4/2002 | Carlson et al. |
| 6,633,255 | B2 | 10/2003 | Krasner |
| 7,817,084 | B2 | 10/2010 | Pon et al. |
| 8,026,847 | B2 | 9/2011 | Pon |
| 8,094,702 | B2 | 1/2012 | Simic et al. |
| 2002/0064210 | A1 | 5/2002 | Sullivan |
| 2003/0039228 | A1 | 2/2003 | Shiu et al. |
| 2003/0081662 | A1 | 5/2003 | Rick et al. |
| 2003/0128747 | A1 | 7/2003 | Poon et al. |
| 2003/0193992 | A1 | 10/2003 | Challa et al. |
| 2004/0042568 | A1 | 3/2004 | Rowitch |
| 2004/0078140 | A1 | 4/2004 | Rowitch et al. |
| 2004/0141574 | A1 | 7/2004 | Akopian |
| 2004/0196183 | A1 | 10/2004 | Roh |
| 2005/0285781 | A1 | 12/2005 | Park et al. |
| 2006/0222058 | A1 | 10/2006 | Simic et al. |
| 2007/0024499 | A1 | 2/2007 | Bochkovskiy et al. |
| 2007/0200754 | A1 | 8/2007 | Fuchs et al. |
| 2008/0068260 | A1 | 3/2008 | Schipper et al. |

FOREIGN PATENT DOCUMENTS

| CN | 101103279 A | 1/2008 |
| JP | 2006504097 A | 2/2006 |
| JP | 2010501862 A | 1/2010 |
| JP | 2010503863 A | 2/2010 |
| TW | 200508641 | 3/2005 |
| TW | 200730859 | 8/2007 |
| TW | 200730860 | 8/2007 |
| WO | 2004038945 A1 | 5/2004 |
| WO | 2006060605 A2 | 6/2006 |

OTHER PUBLICATIONS

International Search Report and Written Opinion—PCT/US2009/041976—ISA/EPO—Sep. 15, 2009.
Taiwan Search Report—TW098114071—TIPO—Dec. 14, 2012.

*Primary Examiner* — Juan A Torres
(74) *Attorney, Agent, or Firm* — Thien T. Nguyen

(57) ABSTRACT

The subject matter disclosed herein relates to a system and method for processing a signal received from a satellite positioning system (SPS) in the presence of a multi-tone jammer. In one particular implementation, processing of a signal may be altered in response to detection of one or more conditions.

16 Claims, 27 Drawing Sheets

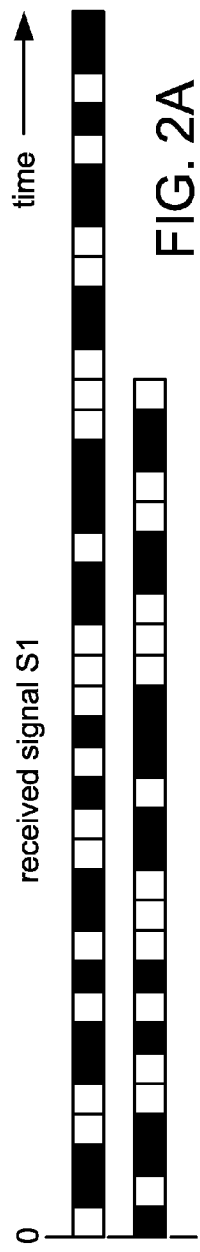
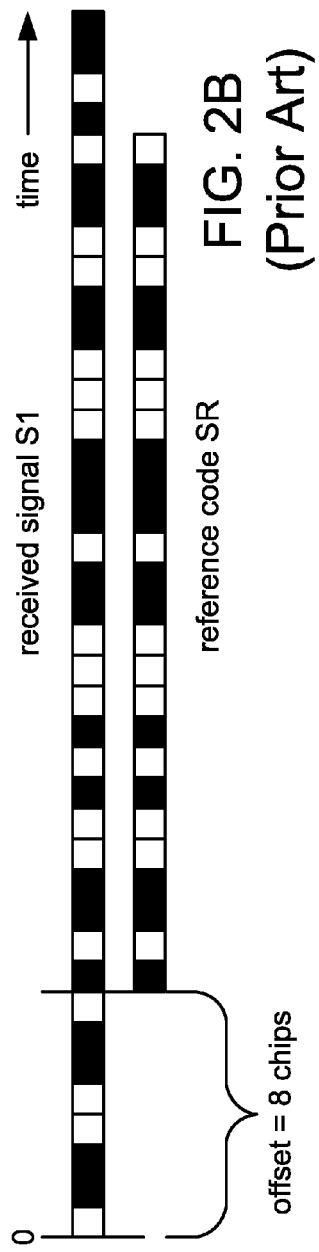
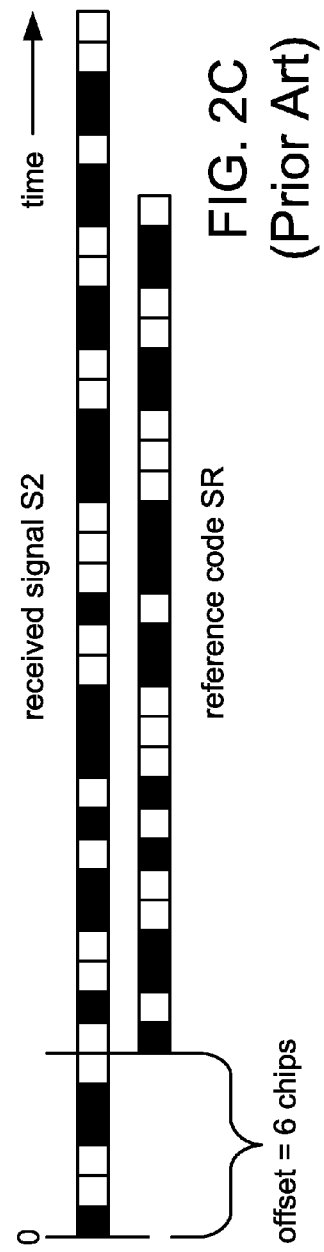
FIG. 2A (Prior Art)
FIG. 2B (Prior Art)
FIG. 2C (Prior Art)

SYSTEM AND/OR METHOD FOR DETECTING MULTI-TONE JAMMING

RELATED APPLICATIONS

This application is a divisional application of U.S. application Ser. No. 12/111,101, filed Apr. 28, 2008, entitled "SYSTEM AND/OR METHOD FOR DETECTING MULTI-TONE JAMMING", which is incorporated herein by reference.

BACKGROUND

1. Field

The subject matter disclosed herein relates to the processing of signals received from a satellite positioning system (SPS).

2. Information

One example of a system for radio-location and time transfer is the NAVSTAR Global Positioning System (GPS) as described in the Global Positioning Service Signal Specification (2d ed., 1995, USCG Navigation Center, Alexandria, Va.). Other examples include the GLONASS GPS maintained by the Russian Republic and the GALILEO system proposed in Europe. NAVSTAR GPS includes a set of satellites or "space vehicles" (SVs) that transmit navigation messages on a 1.57542-GHz carrier (also called the L1 frequency). The navigation messages are transmitted at a data rate of 50 bits per second via a direct sequence spread spectrum (DSSS) signal that is BPSK (binary phase-shift-keying) modulated onto a carrier. To spread the signal, each SV uses a different one of a set of pseudo-random noise (PRN or PN) codes, which are also called "coarse acquisition" or C/A codes. Each C/A code has a chip rate of 1.023 MHz and a length of 1023 chips, such that the code repeats every one millisecond. The C/A codes are Gold codes which are selected for their autocorrelation properties. FIG. 1 shows a portion of an autocorrelation function of GPS PRN 1, which has a magnitude below 0.1 for all code offsets from +1 to +511 and from −1 to −511.

A NAVSTAR GPS SV may also transmit messages via a 10.23 MHz P(Y) code modulated onto a carrier at 1.22760 GHz (also called the L2 frequency). A GPS SV may transmit messages in a similar manner via several other carriers and/or codes as well. One common use of GPS signals is to support position location operations by terrestrial receivers. Typically, signals from at least four SVs are needed to resolve a position in three dimensions.

A GPS signal as received by a terrestrial user typically has a received power of a GPS signal at the earth's surface is −130 dBm. In contrast, thermal noise level is typically about −111 dBm, or nearly 20 dB higher. A receiver inside a building, for example, may be expected to experience an additional 20 dB of signal attenuation from concrete and other building materials, such that a GPS signal received indoors may be about 40 dB below the thermal noise level. In these circumstances, an interfering signal well below the thermal noise level may be sufficient to prevent a GPS receiver from detecting a valid signal, despite the strong autocorrelation properties of the C/A codes.

BRIEF DESCRIPTION OF THE FIGURES

Non-limiting and non-exhaustive features will be described with reference to the following figures, wherein like reference numerals refer to like parts throughout the various figures.

FIGS. 2A-2C show comparisons of received codes with a reference code according to one implementation.

SUMMARY

Figure 1:
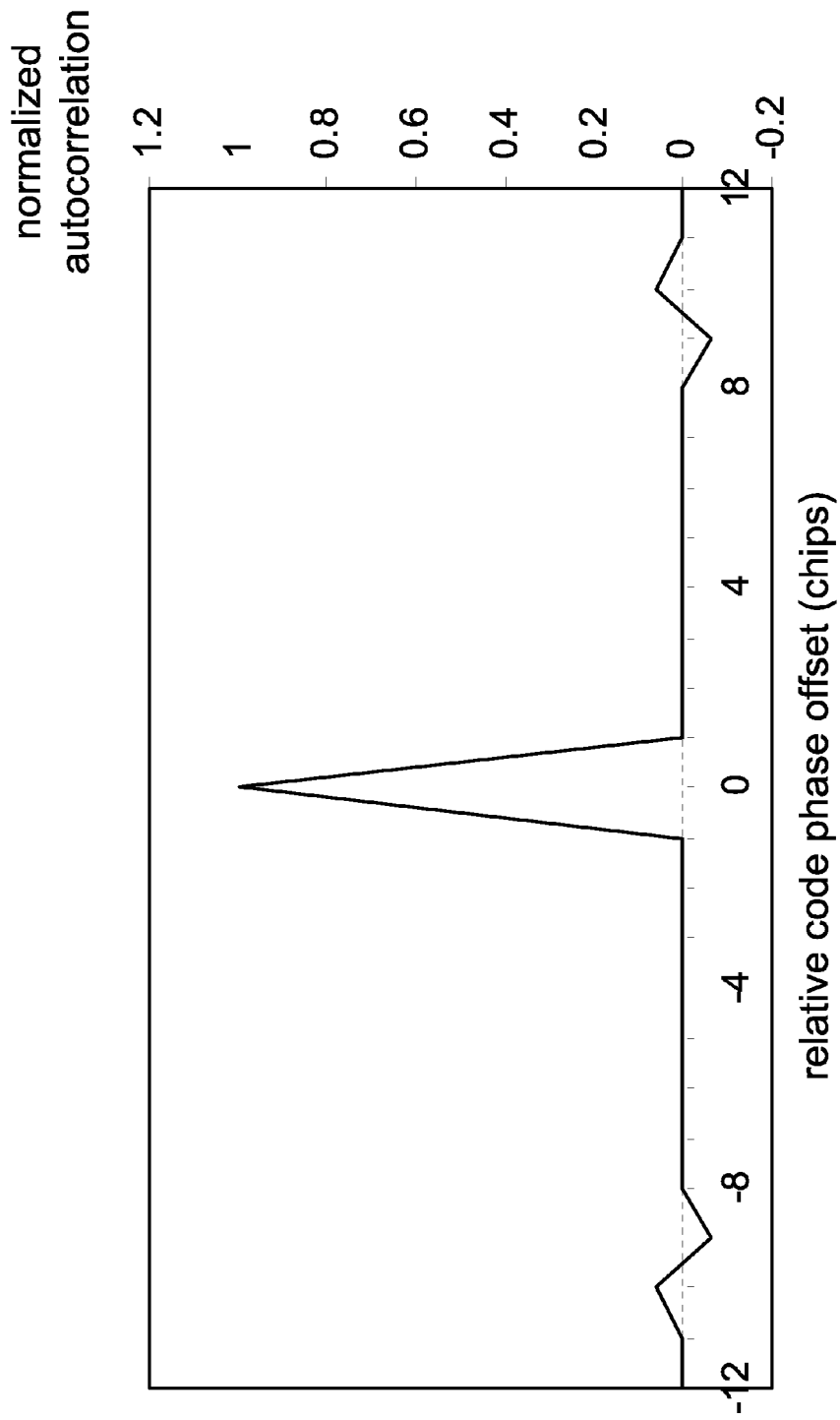
FIG. 1 is a plot showing a portion of an autocorrelation function of a GPS C/A code according to an example.

In one aspect, a received SPS signal is processed to obtain a correlation peak detection in a code phase search window comprising a range of code phase hypotheses. Upon detection of an energy peak within a set range of code phase hypotheses of a boundary of the code phase search window, processing of the received SPS signal may be altered. It should be understood, however, that these are merely examples of aspects of disclosed subject matter and that claimed subject matter is not so limited.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

According to an example, a device and/or system may estimate its location based, at least in part, on signals received from SVs. In particular, such a device and/or system may obtain "pseudorange" measurements comprising approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more SVs as well as their positions at time of transmitting. Knowing the SVs' orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS', and that claimed subject matter is not limited in this respect.

Techniques described herein may be used with any one of several SPS, including the aforementioned SPS', for example. Furthermore, such techniques may be used with positioning determination systems that utilize pseudolites or a combination of satellites and pseudolites. Pseudolites may comprise ground-based transmitters that broadcast a PN code or other ranging code (e.g., similar to a GPS or Code Division Multiple Access(CDMA) cellular signal) modulated on an L-band (or other frequency) carrier signal, which may be synchronized with GPS time. Such a transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

As illustrated below, an SPS signal may be encoded with a repeating sequential code. In one implementation, a receiver may attempting to determine a pseudorange measurement from a received SPS signal based, at least in part, on a code phase associated with the received SPS signal. Here, for example, such a receiver may detect such a code phase based upon a location of an energy peak detection within a code phase search window. However, the presence of multipath, noise and/or jamming may increase the incidence of false alarms.

Figure 7A:
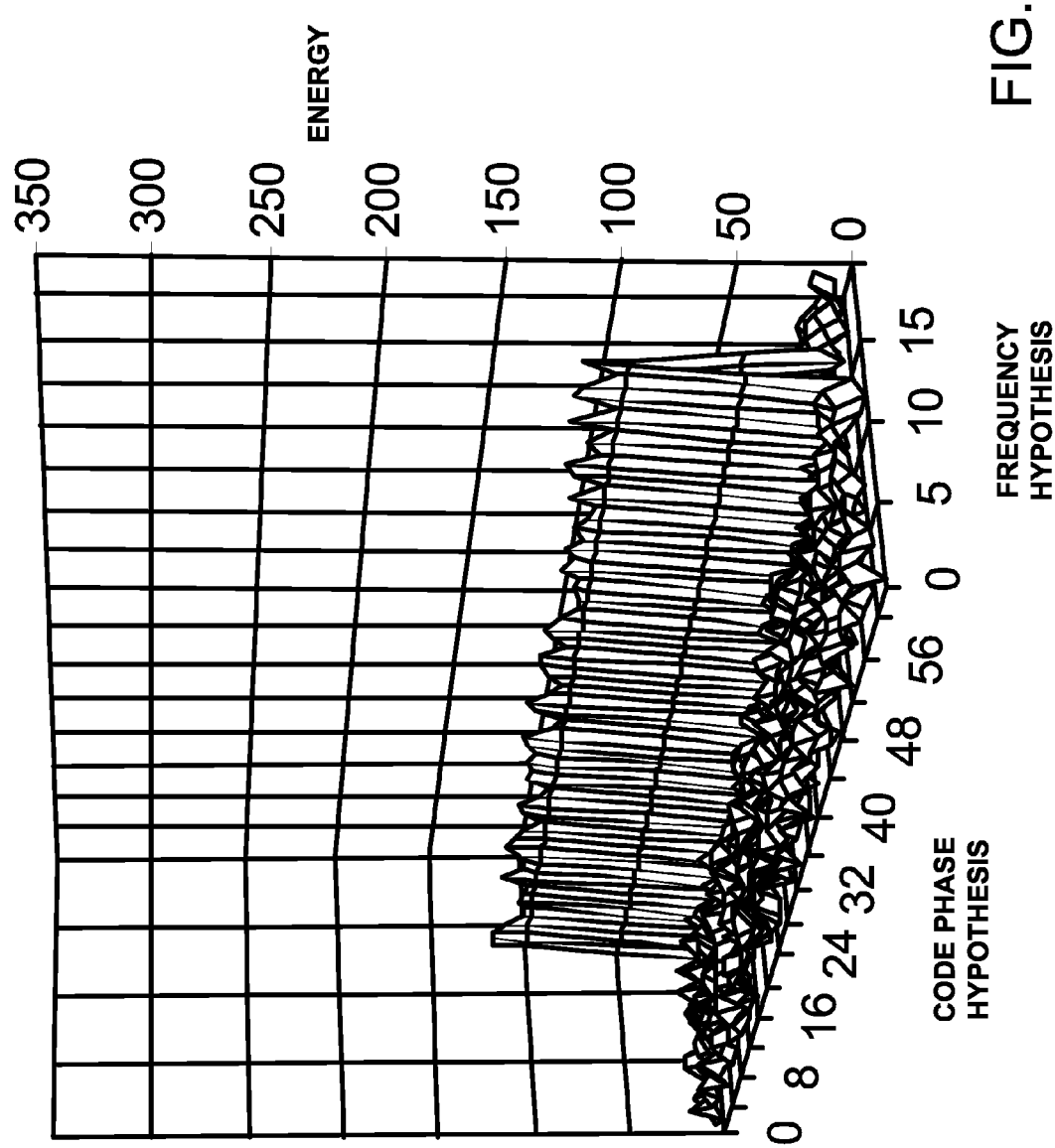
FIG. 7A is an energy plot showing an energy ridge as caused by a jammer in one particular example.

In one aspect, as illustrated below, a single-tone jammer may generate a substantially uniform energy ridge at a particular Doppler frequency and across all code phase detection hypotheses in a code phase search window. Such a uniform energy ridge is illustrated in FIG. 7A. U.S. patent application Ser. No. 11/291,173 for "Systems, Methods and Apparatus for Jammer Detection", filed on Nov. 30, 2005, and assigned to the assignee of claimed subject matter, shows, among other things, techniques for removing such a uniform energy ridge from a code phase search window. Techniques for removing energy from such a single-tone jammer by, for example, detecting such a substantially uniform energy ridge at a particular Doppler frequency. Removal of such energy from a code phase search window may reduce the incidence of false alarms that may result from such a uniform edge.

Figure 7B:
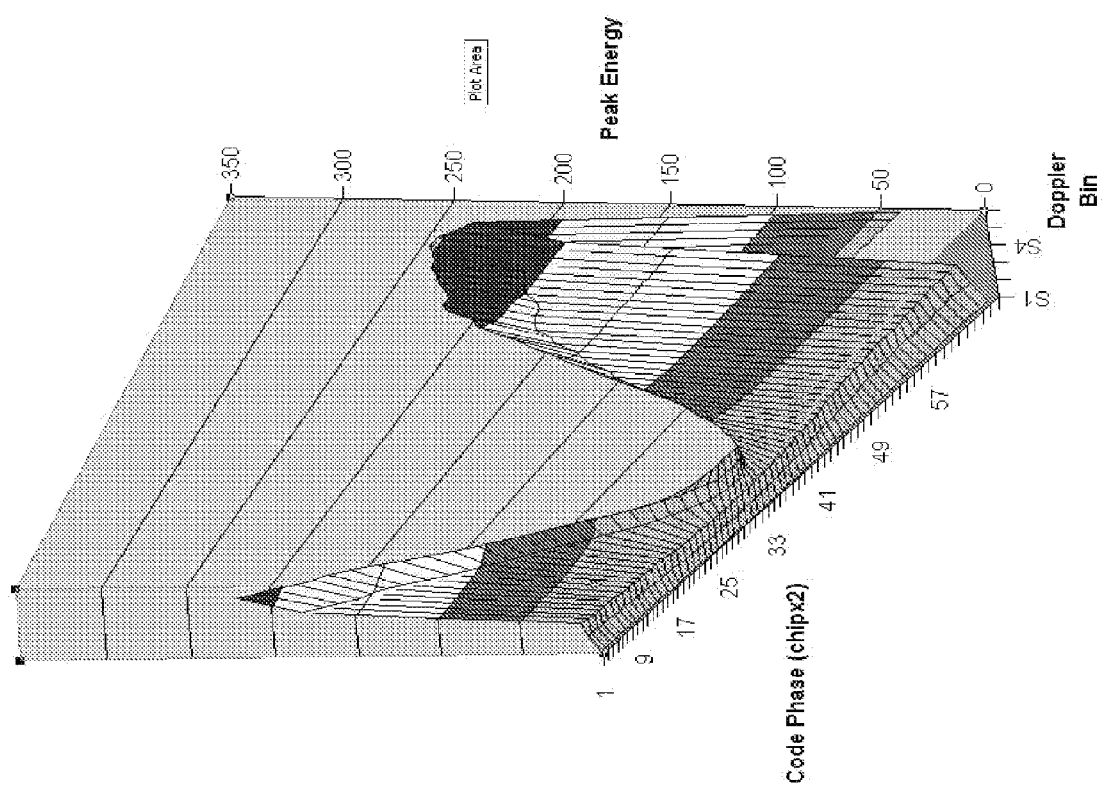
FIGS. 7B and 7C are energy plots showing energy caused by a multi-tone jammer in particular examples.

A multi-tone jammer, on the other hand, may generate, energy that varies non-uniformly in a Doppler regions across a code phase search window as illustrated in FIG. 7B for example. In one aspect, using techniques shown in the aforementioned U.S. patent application Ser. No. 11/291,173, such a non-uniformly varying energy of a multi-tone jammer in a code phase search window may not be detected as a jammer and may appear as multi-path and not as a multi-tone jammer, for example.

Figure 18A:
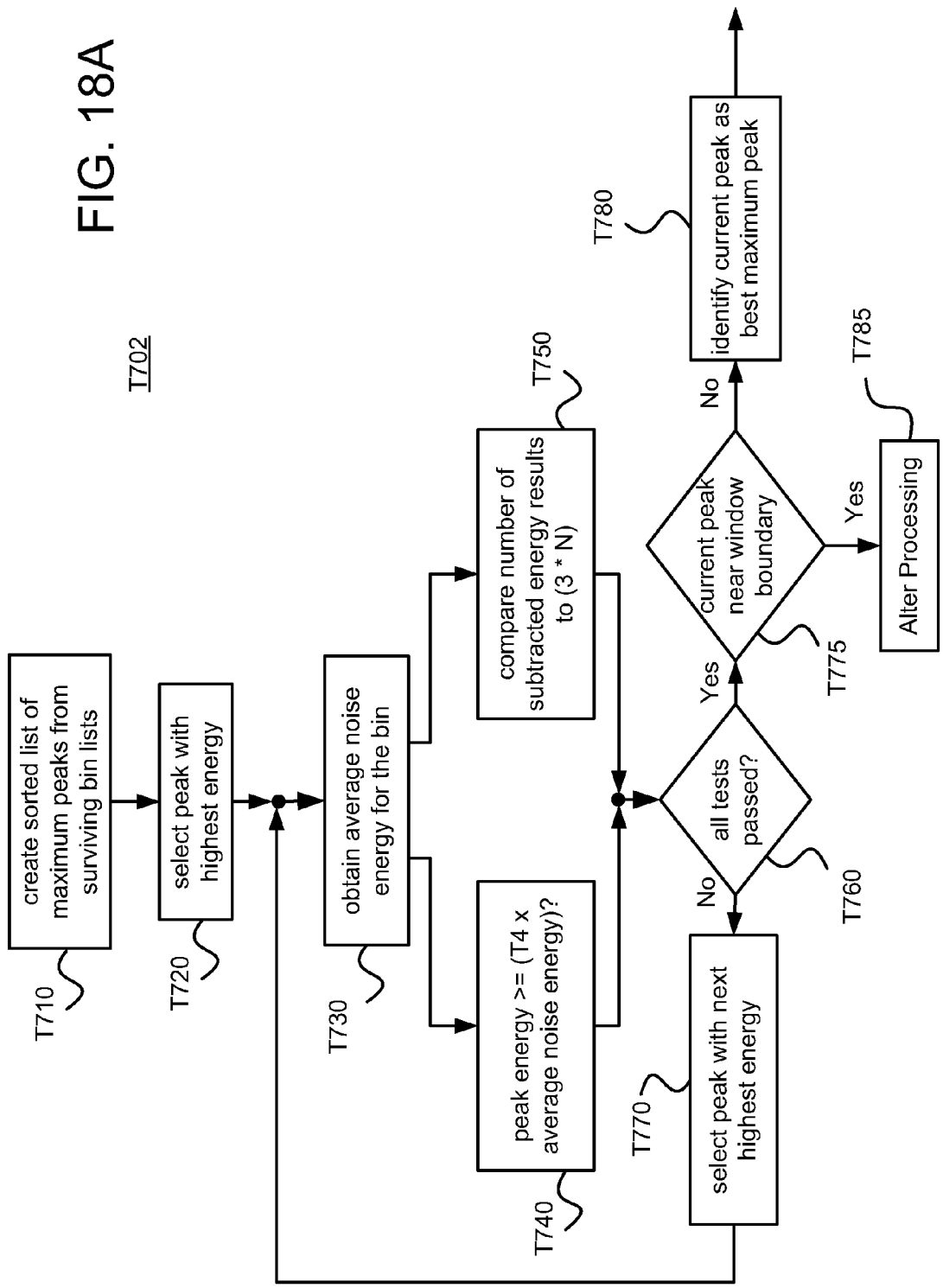
FIG. 18A is a flow diagram of a process for testing bin energy distribution according to a particular implementation.
Figure 18B:
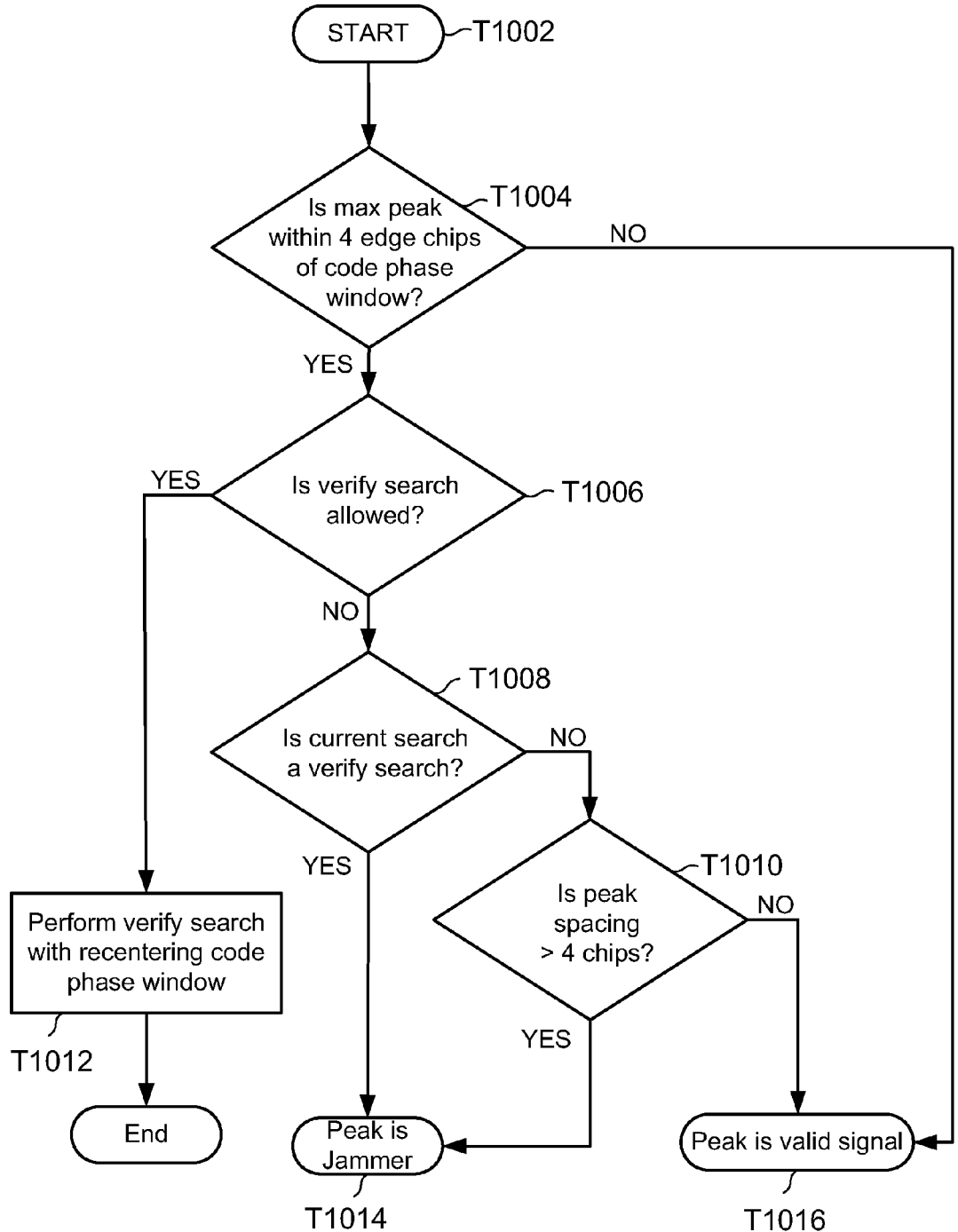
FIG. 18B is a flow diagram of a process for processing energy peaks in the presence of a multi-tone jammer according to a particular implementation.

In one aspect, techniques and methods described herein relate to detection and rejection of energy code phase search window which is caused by a multi-tone jammer. For example, although claimed subject matter is not limited in this respect, methods and processes are adapted to prevent false detection of a multi-tone jammer as a multipath signal FIG. 18B illustrates one particular implementation of a method of processing correlation peaks in a code phase search window to detect a presence of a multi-tone jammer, and alter processing of a received SPS signal accordingly.

Methods for radio-location and/or time transfer include receiving a signal that has a predetermined code (e.g., a sequence of symbols), such as an SPS or CDMA signal. In one particular example, such a predetermined code may comprise a repeating code, such as a GPS C/A code. Alternatively, such a predetermined code may comprise a code that does not repeat or that has a very long period, such as a GPS P(Y) code. In many applications an original code will comprise a sequence of binary symbols such as +1 and −1 (as in a GPS C/A code), although such a code as received may include values ranging from one of the symbol values to the other. For example, the received code may have a complex value, with each component having a value that ranges from one symbol value to the other (e.g. from about +1 to −1). At least some implementations may also be applied to situations in which the original code is not a binary sequence.

It may be desirable for such a predetermined code to comprise a pseudonoise (PN) sequence or to otherwise have a noise-like autocorrelation property (for example, as shown in FIG. 1), such that correlation of the code as received with a reference copy of the code may be expected to yield a well-defined peak. Such a received signal may also be data-modulated. For example, such a received signal may comprise a spread spectrum signal in which the predetermined code is used to spread the bandwidth of a data stream, with the spread data stream then being used to modulate a carrier (via, for example, a Phase Shift Keying (PSK) modulation).

The description herein refers primarily to examples of application to a C/A code on a GPS L1 carrier, and particular implementations include systems, methods, and apparatus that receive and process such codes. However, other implementations may also include systems, methods, and apparatus that operate on other codes instead, and systems, methods, and apparatus that operate on these codes as well as others (e.g. GPS P(Y) codes, Galileo, Glonass and/or CDMA PN codes). Thus claimed subject matter is not limited to this particular application or to these particular predetermined codes. Other signals to which implementations may be adapted include GPS L1 M, L1 P/Y, L2 Civil, L2 P/Y, L2 M, and/or L5 Civil. Principles described herein may also be applied to reception of transmissions including a data signal and a pilot signal (e.g. GPS L5, Galileo E5 a and/or E5 b).

FIG. 2A shows an example of a comparison between a predetermined code S1 as received (beginning at time index 0) and a reference copy SR of the code (hereinafter referred to as the "reference code"). In this example, filled squares indicate one binary symbol (e.g., +1) and open squares indicate the other binary symbol (e.g., −1). It may be seen that in the example of FIG. 2A, the two codes are not aligned.

In FIG. 2B, reference code SR is shifted to an offset of eight chips with respect to time index 0. With a reference code in this position, the two codes are now aligned. An offset between the code as received and the reference code, if the reference code is in a position such that the two codes are aligned, is called the code phase of the signal. Thus, received code Si has a code phase of eight chips.

FIG. 2C shows an example of an alignment between a reference code and another received code S2, which has a code phase of six chips. In this example, received signal carrying code S2 has also been data-modulated, such that the symbols of the received code S2 over the code period are inverted as compared with those of the reference code.

The code phase may be used as an indication of the delay of the received signal, which in turn may be used as a measure of the distance between transmitter and receiver. Additionally or alternatively, a code phase may be used in synchronizing operations relating to the reception and/or transmission of one or more other signals. For example, timing information derived from the code phase may be used to synchronize a receiver to a slotted access channel. Examples of a slotted access channel include an access channel, which may be transmitted by the transmitter of the received code (e.g. on a downlink or reverse link), and a paging channel, which may be monitored by a receiver at that location (e.g. on an uplink or forward link).

Correlation of a received code sequence with a reference code may be performed in the time domain by integrating the product of the received and reference codes over some portion of the length of the reference code according to relation (1) as follows:

$$y(t) = \int_{k=0}^{N-1} x(t+k)r(k) \quad (1)$$

where x is the received code, r is the reference code of length N, and y(t) is the correlation result at offset t. Here, a received code may comprise a complex baseband signal, such that the correlation is performed for each of I and Q components of the received code.

Alternatively, a correlation result of the received signal and reference code for a given offset may be obtained by convolving the signal with, for example, a matched filter of the complex reference code r+jr (i.e. a filter having an impulse response that is the time-reversed complex conjugate of the reference code) according to relation (2) as follows:

$$y(t) = \int_{k=0}^{N-1} r^*(N-1-k)x(t-k) \quad (2)$$

where $r^* = r - jr$ is the complex conjugate of the complex reference code.

For a GPS C/A code implementation, the results of relations (1) and (2) over a range of offsets will have the shape of a sinc function, just as an example. While correlation results obtained using either expression (and/or another expression of the degree of correlation of the two codes) may be used as an energy result for the corresponding offset, the energy result may be calculated as the sum of the squares of such correlation results for the I and Q components. The result of such a calculation over a range of offsets may have the shape of a $(\text{sinc})^2$ function, whose peak is sharper and thus more localized than that of a sinc function.

As energy calculation operation may be performed on a sampled received signal, the operations described in relations (1) and (2) and an energy calculation operation at offset t may be expressed in discrete time as:

$$y(t) = \sum_{k=0}^{N-1} x(t+k)r(k) \quad (3)$$

$$y(t) = \sum_{k=0}^{N-1} r^*(N-1-k)x(t-k) \quad (4)$$

$$e(t) = \left[\sum_{k=0}^{N-1} xI(t+k)r(k)\right]^2 + \left[\sum_{k=0}^{N-1} xQ(t+k)r(k)\right]^2 \quad (5)$$

respectively, where xI is the in-phase component of a received code, xQ is the quadrature component of the received code, and e(t) is the energy result at offset t.

Depending on a particular design, energy results may be expressed as fixed-point or floating-point values, and they may in arbitrary units, e.g. in a case where the energy results are used only to determine relative differences between the peaks. In a case where an energy result may also be used for one or more other tasks (e.g. compared to other system parameters), the measurement scale may be selected as appropriate for such a task or tasks.

Figure 3:
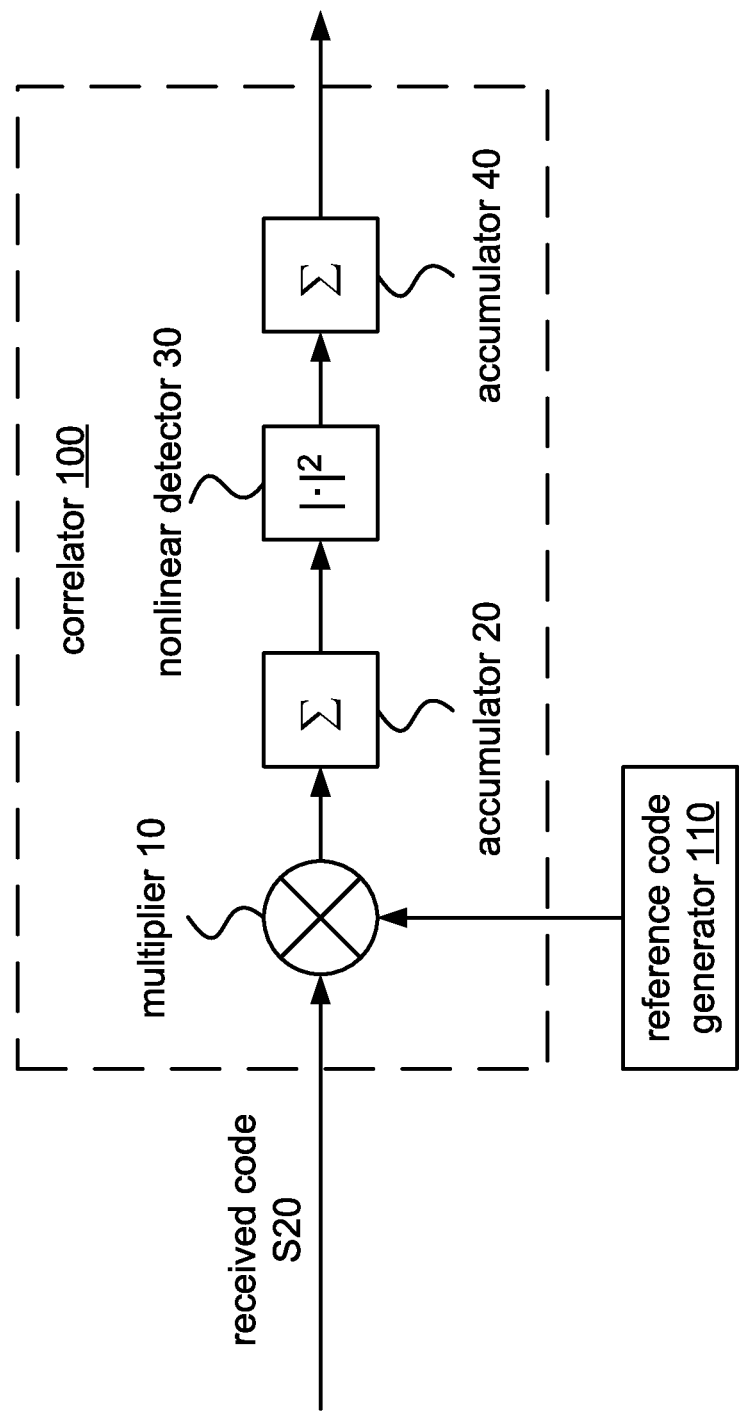
FIG. 3 is a schematic block diagram of a correlator according to a particular example.

FIG. 3 shows a block diagram of one example of a correlator 100 that may be used to obtain energy results in one particular implementation. Multiplier 10 is adapted to multiply complex received code S20 with a reference code, and accumulator 20 is adapted to accumulate products over a length of the reference code. Nonlinear detector 30, which may be implemented as a squarer, is adapted to obtain a squared sum for each component, and accumulator 40 is adapted to add the squared sums to obtain the energy result. Reference code generator 110, which may be implemented as a shift register such as a linear feedback shift register (LFSR), may be clocked according to the chip rate of the received code or some derivative thereof. Alternatively, a reference code may be read from storage at an appropriate rate or received from an external device or circuit.

Although the example of FIG. 3 shows a serial correlator, correlator 100 may also be implemented to perform parallel correlation (multiplying more than one bit of the codes at the same time) or any combination of serial and parallel operation. A GPS receiver, for example, may include multiple instances of correlator 100, each receiving a copy of a reference code and applying a different corresponding delay, to obtain results for more than one code phase hypothesis at a time. Multiple instances of correlator 100 may also be used to search on more than one reference code at a time. A module including one or more correlators and logic (e.g. a processor) configured to control the correlators to obtain energy results for a desired set of hypotheses may be called a searcher or a means for searching.

In contrast to examples in FIGS. 2A-2C, symbols of a code as received may be somewhat ambiguous. Nevertheless, the complexity of the correlation and/or energy calculations may be reduced somewhat according to the nature of the reference code and the criteria of the particular application. In a GPS C/A code application, for example, a result of multiplying a received symbol with a reference code symbol is either the received symbol or its inverse. If the associated loss in signal-to-noise ratio is acceptable, the received symbol may even be classified as +1 or −1, such that the multiplication may be reduced to an XOR operation. Implementations include systems, methods, and apparatus that employ these and similar optimizations.

Calculation of an energy result as described above may be repeated for each offset (or "code phase hypothesis") to be considered. In the GPS C/A code phase circle, there are 1023 possible hypotheses (or 2046 hypotheses at a resolution of ½ chip). In many cases, however, the number of hypotheses to be searched may be greatly reduced by applying knowledge of the code phase location of the received code as obtained from previous searches and/or from an external source (such as a position determination entity (PDE)). In such an implementation, a search may be reduced to a width of, for example, 256 chips or 32 chips or less.

Alternatively, correlation and/or energy results for the various code phase hypotheses may be obtained via operations in a frequency domain. Here, an entire code phase circle may be efficiently searched at a selected resolution by, for example, transforming the received code into the frequency domain (e.g., using a discrete Fourier transform (DFT) operation such as a fast Fourier transform (FFT)), multiplying the transformed signal with a matched filter of the reference code, and applying an inverse transform to obtain the corresponding results in the time domain. Some frequency-domain correlation techniques may also be used to perform a more narrow search in the frequency domain. For example, U.S. Published Patent Application No. 2004/0141574 (Akopian, published Jul. 22, 2004) purports to describe a frequency-domain method for searching over a limited range of code phases.

As for calculations in a time domain, it may be desired in frequency-domain implementations to include multiple instances of an appropriate correlator (e.g., a set of logic elements, such as transistors and/or gates, programmed or otherwise arranged to perform FFT, IFFT, and associated operations) to support searching for more than one reference code at a time. It may also be desirable to perform transformation of the reference code in advance and store the result in memory (e.g., in nonvolatile memory).

In addition to locating a received code in code phase dimension, it may also be desirable to consider relative motion between a receiver and a transmitter. Here, such relative motion between a receiver and a transmission source (and/or apparent motion between the two, as might be caused by a moving reflector) causes a Doppler frequency error at the receiver that can be expressed in Hertz as $$\frac{vf}{c}\cos\varphi,$$

where v is the apparent relative velocity of the receiver and source, f is the carrier frequency in Hertz, c is the speed of light, and $\phi$ is the angle between the direction of travel of the receiver and the direction from the receiver to the transmission source. If the receiver is traveling directly toward the source, then $\phi=0$, and if the receiver is traveling directly away from the source, then $\phi=0$ radians.

For a terrestrial GPS user in a particular implementation, a Doppler shift due to the combined movement of the SV and user relative to one another may amount to about +/−2.7 ppm. Frequency error of one or more oscillators at the receiver may add about another 2 ppm, for a total of 4.7 ppm of frequency uncertainty (alternatively, local oscillator error may be corrected at least somewhat, e.g. with a Phase-Locked Loop (PLL) or other correction loop). This 4.7 ppm corresponds to about +/−7.5 kHz at the L1 carrier frequency of 1.57542 GHz. Filters may be used to remove frequency components outside that range.

In addition to searching for the signal in code space, therefore, a receiving device may also search for the signal in frequency space. Many techniques and corresponding correlator and searcher structures may be used to obtain search results in two dimensions using operations in the time domain and/or in the frequency domain. In one particular example, correlation is performed in the time domain for a particular code phase hypothesis, and the result is transformed to the frequency domain (e.g. using a DFT or FFT) where the desired range of frequency hypotheses are searched for that code phase hypothesis. Such an operation may be repeated across the desired range of code phase hypotheses.

For received signals having very low levels (such as GPS signals), it may be desirable to accumulate energy at a particular grid point using coherent integration. In the time domain, coherent integration may be accomplished by summing correlation and/or energy results over more than one consecutive code period of the received code, and in the frequency domain it may be performed by summing each of the frequency components over time.

Because a GPS C/A signal is modulated with data at a rate of 50 bits/second, coherent integration of the signal may be limited to twenty milliseconds. If the data is known a priori, it may be removed from the signal (a process called data wipeoff or modulation wipeoff), and the coherent integration period may be extended to 40 milliseconds or even up to 160 milliseconds or more, for example. Non-coherent integration may also be applied to combine results from non-consecutive code periods, or coherent integration periods, up to 88 or more times. In a communications device having an integrated GPS receiving device, the integration time may be limited by a maximum tune-away time relating to requirements of the communications channel.

In particular implementations, data transmitted on a GPS C/A signal is largely redundant, and data to support modulation wipeoff may be provided by an external unit such as a PDE. A PDE may provide related information such as which SVs are currently visible and their approximate code phases and Dopplers. A PDE may also be configured to request a GPS receiving device to initiate a search. Communication between a GPS receiving device and a PDE may take place over a network for cellular communications (for example, via a cellular telephone transceiver with which a GPS receiver is integrated).

Spacings and ranges of code and/or frequency hypotheses may be varied based on factors such as strength of the desired SV signal, interfering signal strength, range of code phase and frequency uncertainty, desired accuracy, desired probability of detection, and desired time-to-fix. Here, for example, a code phase spacing may include 1 chip, ½ chip, and ¼ chip. Frequency ranges include, for example, +/−31.25 Hz, 62.5 Hz, 125 Hz, and 250 Hz, with the range being divided into, for a particular implementation, twenty frequency bins. Smearing of received energy across two or more code phase and/or frequency bins may occur if the integration period is too long. Smearing of received energy across two or more frequency bins may also occur if the spacing in the frequency domain is too narrow.

A receiving device (or a searcher within such a device) may be configured to perform searches according to a selectable one of several different search modes distinguished by such characteristics as frequency spacing and integration lengths. For example, a search operation may include a low-resolution, wide-range search followed by one or more searches at a finer resolution. Searching may be performed for initial code acquisition, with subsequent tracking being done using a timing loop. In other applications, acquisition of the code may be sufficient. Whether within the receiving device or in another unit that is in communication with the device (such as a PDE), the code phase of the received code may be used to derive a measurement of time-of-arrival of the received code (or pseudorange), and pseudoranges from several SVs may be combined to obtain a position in space.

A received signal may carry more than one code. For example, at any location on the earth's surface there may be up to twelve different GPS SVs visible, such that a GPS signal as received may include codes transmitted by more than one SV. A GPS receiving device may search for four, eight, or more SVs at once, for example. Such searches, which may be performed on the same portion of a received signal, may be conducted serially and/or in parallel.

Figure 4:
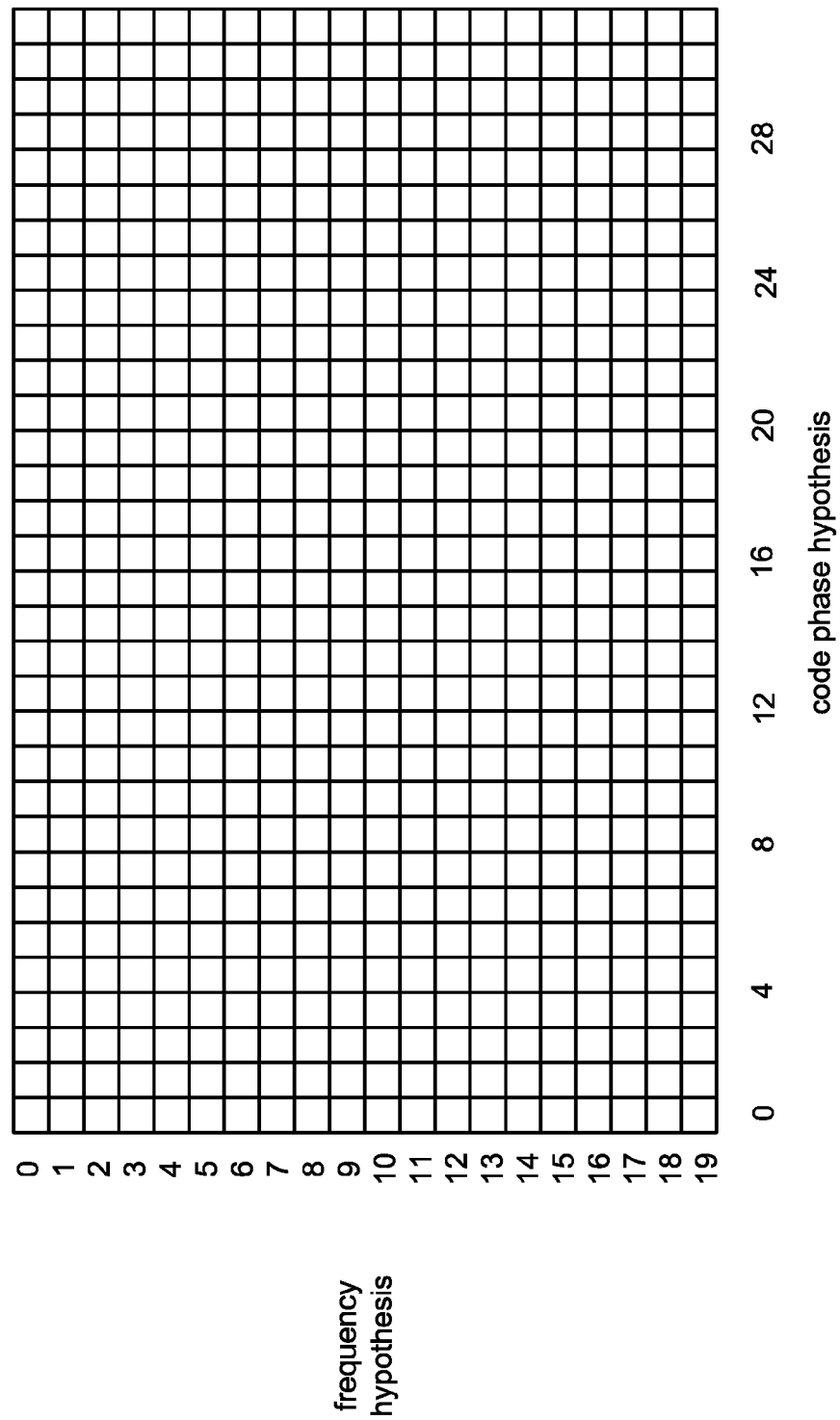
FIG. 4 is a diagram showing a two-dimensional search window according to one particular implementation.

FIG. 4 shows an example of a code phase search window extending across twenty hypotheses in the frequency dimension and 32 code phase hypotheses or bins in a code phase dimension. Selection of the particular location and/or spacing of the hypotheses of each dimension of the code phase search window may be guided by information obtained externally and/or from one or more previous searches. For example, it may be known or estimated that the desired signal lies within a certain number of chips from a given code phase, and/or that the signal may be found within a certain bandwidth around a given frequency, such that the code phase search window may be defined accordingly. Also, as discussed below, a code phase search window may be shifted in the code phase dimension in response to detection of one or more conditions for the purse of detecting a multi-tone jammer, for example. In a case where searches are to be conducted for more than one code, associated search windows need not have the same dimensions.

A search may be conducted (for example, according to a search window of D frequency hypotheses by C code hypotheses) to obtain a grid of D×C energy results, each result corresponding to one of the D frequency hypotheses and one of the C code hypotheses. We refer to the set of energy results that correspond to the code phase hypotheses for a particular frequency hypothesis as a "Doppler bin."

Figure 5:
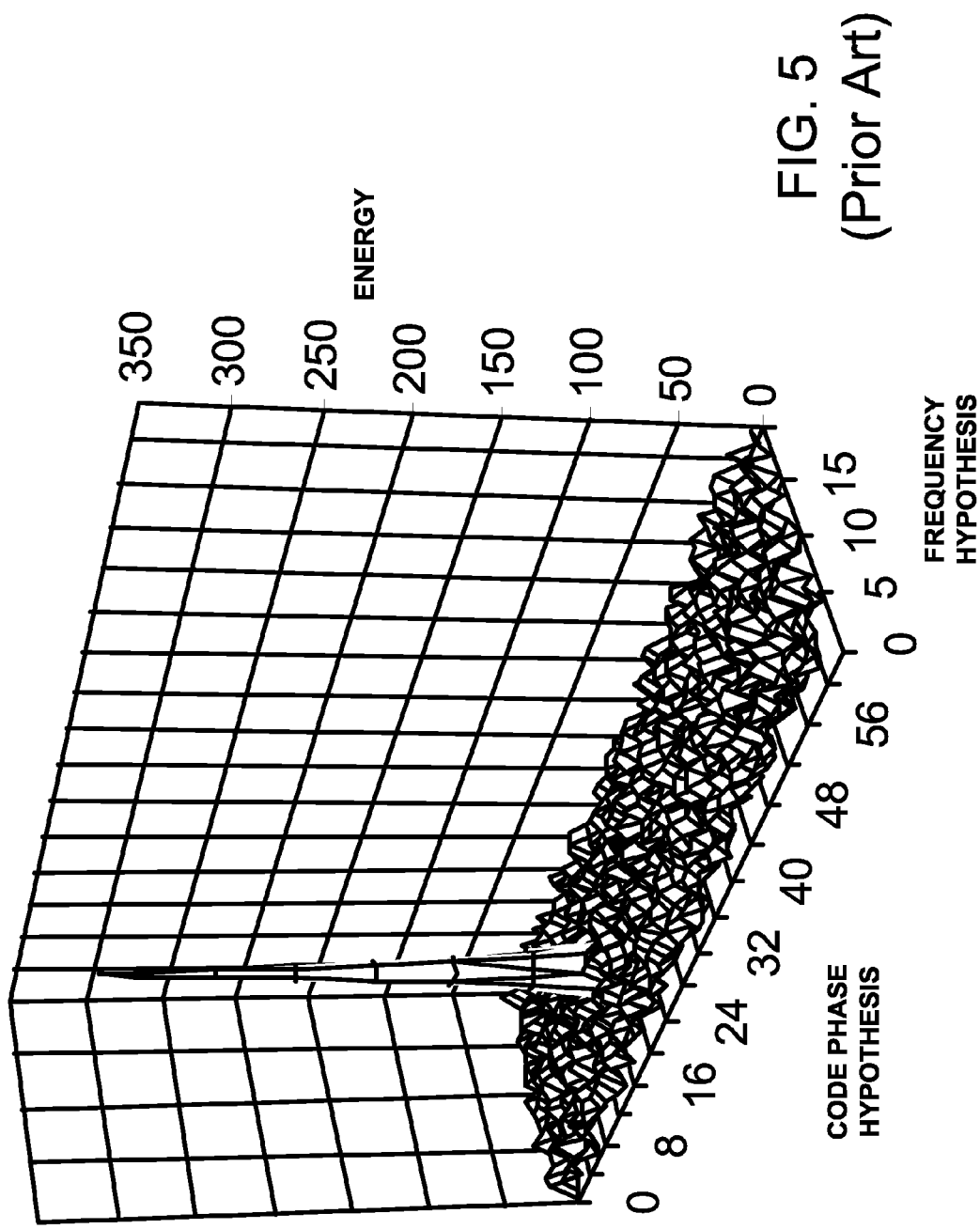
FIG. 5 is an energy plot showing a peak as may be obtained from a line-of-sight signal in one particular example.

FIG. 5 shows an example of a peak within an energy grid of twenty Doppler bins, each bin having 64 code phase hypotheses. In this example, adjacent code phase hypotheses are ½-chip apart, such that the grid extends across 32 chips in code space. An energy peak in this figure indicates a presence of the selected SV signal at code phase hypothesis 16 in Doppler bin 10. A receiver (or a searcher within such a device) may produce energy grids for several different corresponding SVs from the same portion of a received signal, with the grids possibly having different dimensions.

Figure 6:
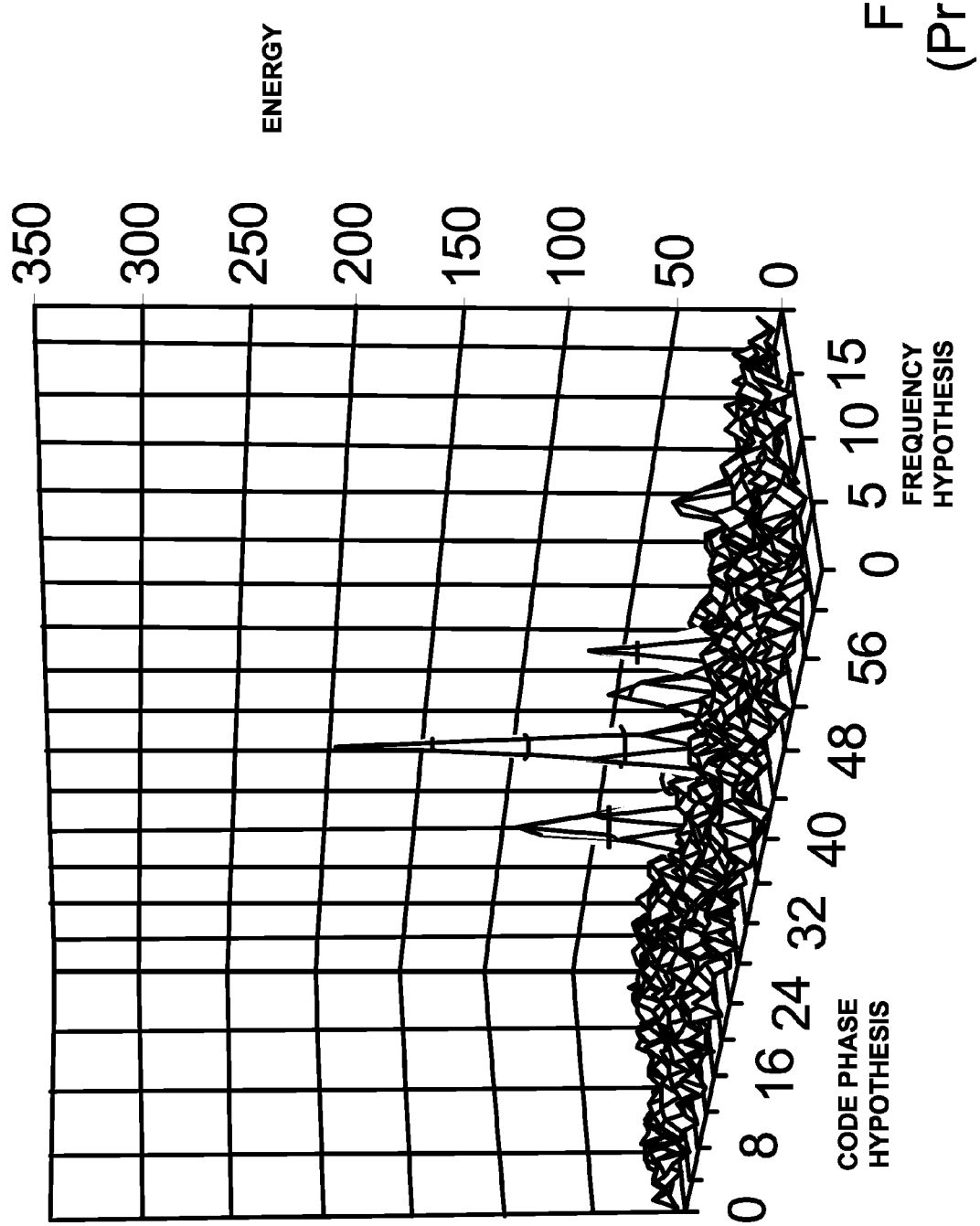
FIG. 6 is an energy plot showing several peaks due to multipath instances of the same transmitted signal in one particular example.

A received signal may include versions of the same transmitted signal that propagate over different paths to arrive at the receiver at different times. Correlation of such a received signal with the corresponding reference code may result in several peaks at different grid points, each peak due to a different instance (also called a multipath) of the transmitted signal. These multipath peaks may fall within the same Doppler bin, unless the relative velocity between transmitter and receiver changes significantly with respect to the delays among the various multipaths. FIG. 6 shows an example in which several peaks due to multipath instances of a transmitted signal are all located in the same Doppler bin.

An energy grid may also include peaks due to effects other than valid correlations of the reference code with the signal of the particular SV being searched. For example, an in-band signal from another source may also have sufficient energy to produce one or more peaks within the grid. Such a signal may be broadly referred to as a jammer.

In one particular example, a receiving device may be self-jamming. That is, the jamming signal may arise from an internal source. Common internal jammers may include, for example, clock spurs or leakage from an internal oscillator such as a phase-locked loop (PLL), a voltage-controlled oscillator (VCO), a local oscillator (LO) or another oscillator or clock circuit used for frequency conversion and/or for clocking of a digital logic circuit such as a processor. A jamming signal may also arise from an external source, such as a clock spur or oscillator leakage from a nearby GPS receiver. It should be understood, however, that these are merely examples of jammers and/or sources of jamming signals, and claimed subject matter is not limited in these respects.

Continuous-wave (CW) in-band jamming signal may be spread across code space by the correlation operation, which will also attenuate the signal by about 30 dBc. As shown in the example of FIG. 7A, a jammer may cause a series of peaks having similar energies at many or all of the code phase hypotheses at the corresponding frequency. Given the strength of an SPS signal received at an earth-based receiver, even a jammer well below the thermal noise level may be enough to cause a large number of relatively strong peaks in the energy grid and thus prevent a receiver from finding an existing valid correlation peak.

In an ideal situation, the peak having the highest energy within the grid would correspond to the valid correlation, so that locating the code among the various hypotheses would simply be a matter of finding the peak with the highest energy.

As demonstrated in the particular multipath example of FIG. 6, however, the highest peak within a grid may not be the most accurate. Therefore it is desirable to conduct additional processing of at least some of the grid values to locate the received code.

In particular implementations, it may be desirable to minimize chip area in devices used to build an SPS receiver. Because arrays of data storage elements (such as memory cells) tend to occupy a lot of chip area, it is generally desirable to implement a chip design such that the number of data storage elements is reduced without unduly affecting other operating parameters. It may be desired to implement a searcher (or its processing logic) such that the array of storage elements to which the grid values are stored is reused in successive searches (e.g. searches using a different reference code, or using the same reference code on a different portion of the received code). Such a searcher may be configured to extract enough information from the grid to support a search for the best peak, and to store this information or to otherwise provide it to another unit (e.g. to be stored and processed), before allowing the grid to be overwritten. For example, the operations of directing the search and reporting the peaks may be executed by one processing unit (e.g. in firmware), while the operations of determining which is the best one may be executed by another processing unit (e.g. in software) that cannot access the full grid. In one particular implementation, such stored information may include a maximum peak list, or a list of the strongest peaks of the grid (for example, the ten peaks having the highest energies) and the code phase and frequency hypotheses to which they correspond.

A large search may be performed by segmenting the desired search space, in either or both dimensions, into several smaller "windows." For example, results from code phase search windows that are adjacent in code space may be combined to effectively create a larger code phase search window in code space. In such manner, eight 32-chip code phase search windows (each covering 64 hypotheses, for example) may be combined to create an effective code phase search window of about 256 chips (e.g. about 512 hypotheses). Likewise, results from code phase search windows that are adjacent in frequency space may be combined to effectively create a larger code phase search window in frequency space.

It may be desirable to overlap code phase search windows that are to be combined, especially in a case where resulting grids are to be processed independently from one another. For example, an overlap of at least one hypothesis may be desired so that it may be determined whether a hypothesis at the edge of a grid is a local maximum. Moreover, it may be desired to overlap code phase search windows in code space by several chips so that peaks due to earlier multipaths may be identified.

Figure 8:
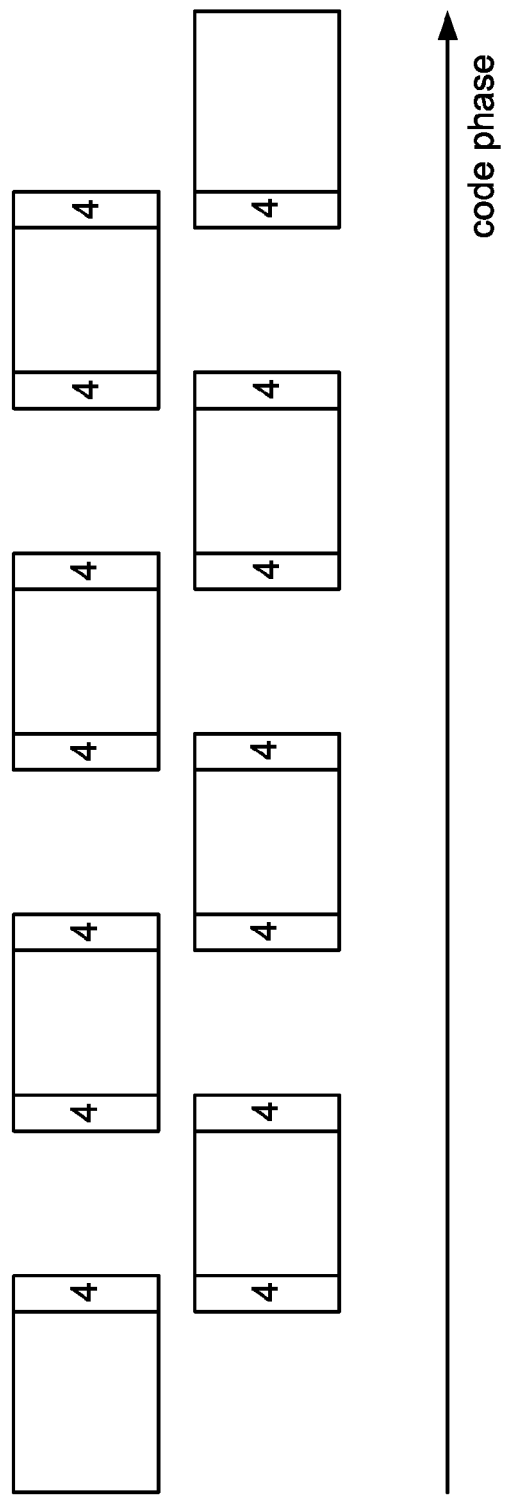
FIG. 8 is a diagram showing an overlap in code phase space between adjacent code phase search window segments in one particular implementation.

In one particular example, a location of largest peak in a grid may be associated with a location of the valid correlation result. However, if a relatively strong peak is found in the same Doppler bin as the largest peak, and within eight chips before it, for example, then the earlier peak may be assumed to be the first (i.e. most direct) multipath of the same signal and is selected as the valid correlation result instead. If the earlier peak occurs in a different window segment than the largest peak, then the association between the two peaks may remain unknown. Therefore, it may be desirable to overlap individual window segments (in this case, by four chips) as shown in FIG. 8.

Unfortunately, such overlapping adds overhead to the search process. If each of the eight window segments in FIG. 8 is 64 hypotheses wide, a resulting effective search window may be only 484 hypotheses wide, even though the width in total number of searches performed is 512.

To avoid the overhead associated with segmented code phase search windows, it may be desirable to increase the size of a code phase search window instead. For example, it may be desired to implement a code phase search window whose dimension in code space and/or frequency space may be changed dynamically (e.g. from 64 up to 512½—chip hypotheses in code space).

Figure 9:
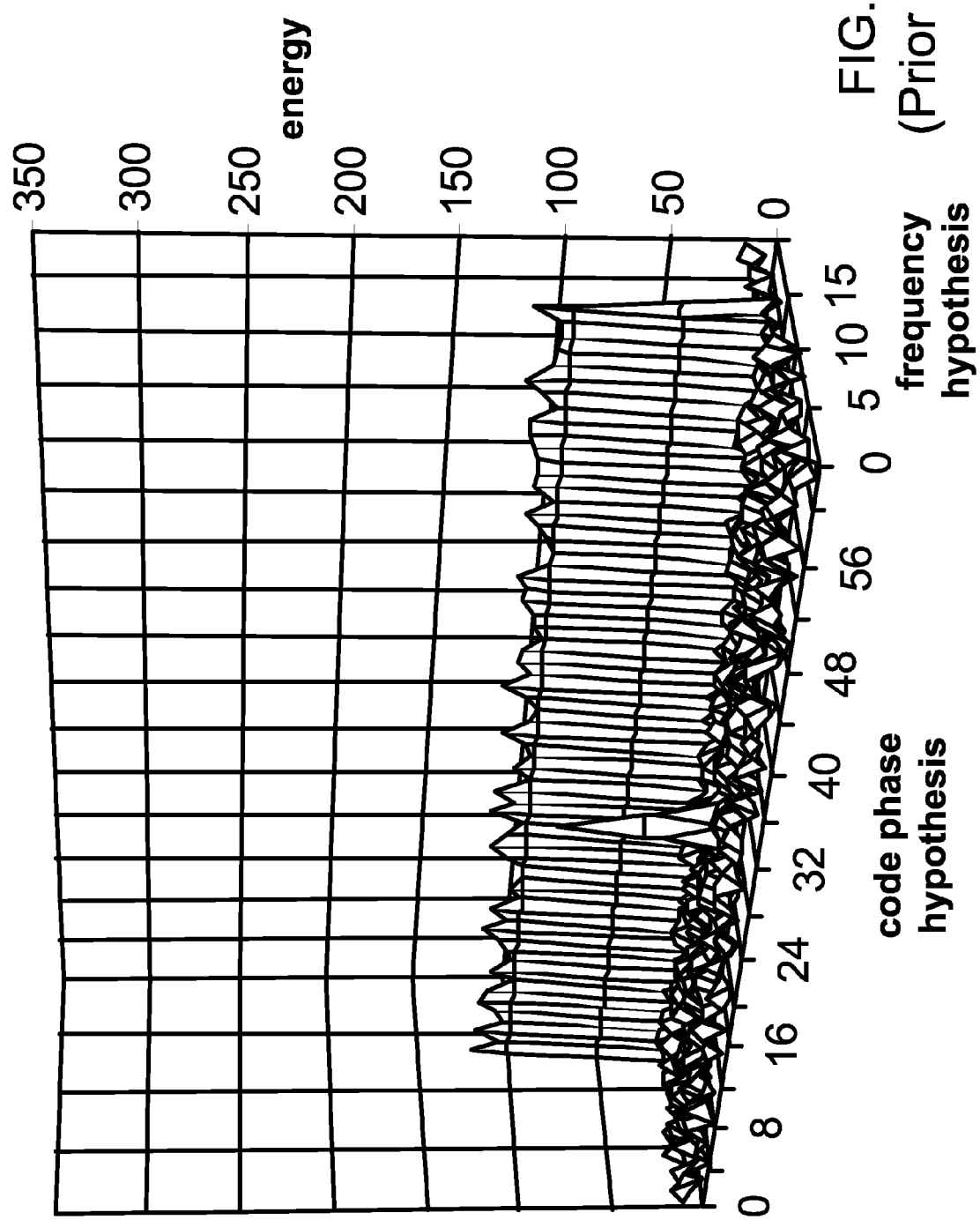
FIG. 9 is an energy plot showing an energy peak and an energy ridge in one particular example.

FIG. 9 shows an energy grid in which the peaks of a jammer ridge all have higher energy values than the valid peak. In such a case, all of the entries of a maximum peak list of reasonable size may be occupied by the jammer, thus preventing location of the signal. As the number of spurious peaks caused by a jammer will be expected to increase with the size of the search grid in the code phase dimension, a jammer within a search window that is extended in code phase will be even more likely to overload a maximum peak list.

Figure 10:
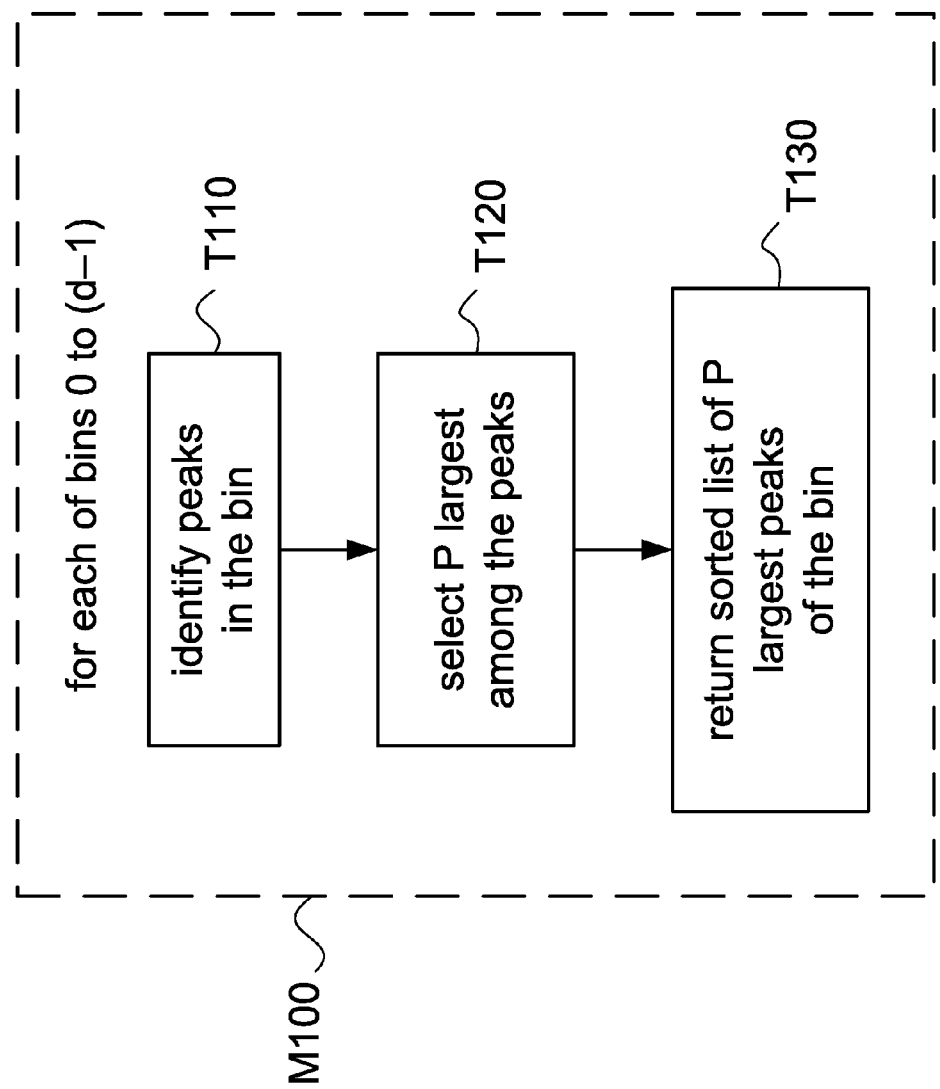
FIG. 10 is a flow diagram illustrating a process for providing a list of peaks detected in Doppler bin in one particular implementation.

FIG. 10 is a flow diagram illustrating a process M100 according to an implementation. Such a method may be performed for each of the D bins in an energy grid, or it may be desired to exclude some of the bins from this processing operation. For example, sufficient information to determine whether any of the energy results in the outer Doppler bins are local maxima may not be available. Therefore, it may be decided to perform the method only on the (D-2) other bins. Reasons may exist for excluding other bins as well. For example, previous searches may indicate that one or more bins are too corrupted to yield reliable results, or it may be desired (e.g. on the basis of additional information) to reduce the search to a more narrow portion of the frequency space. Thus, process M100 may be performed for each of d bins in the energy grid, where d is greater than one and less than or equal to D.

Although as a matter of convenience this description refers to the notion of a grid of energy values, it should be understood that it may not be necessary for all of the values in such a grid to exist at any one moment. While some values are being processed (for example, according to an implementation of process M100), other values of the "grid" may not yet have been calculated, while values of the "grid" that have already been processed may have been replaced. Indeed, even within a bin it may not be necessary for all of the values to exist at any one moment, and processing of a bin according to some implementations of process M100 may begin before all bin values are available Task T110 may identify peaks in a bin. For example, task T110 may be implemented to classify as peaks those energy results which are local maxima in code phase space and in frequency space. Task T110 may skip the first and/or last code phase hypotheses for each bin, as sufficient information to determine whether the results at these points are local maxima may not be available. However, it may be desired to perform task T110 such that results at grid points which are excluded from process M100 are still considered in determining whether a result under test is a local maximum. In some implementations of task T110, computational complexity may be reduced by skipping (in code phase and/or in frequency) grid points that are adjacent to identified local maxima in either dimension.

Task T120 may select the P largest among the peaks in a bin. The value of P may be selected, for example, according to a desired maximum allowed number of multipaths N. The value of N, which may be selected heuristically, may be chosen from among a set of values according to a characteristic of the received signal and/or the receiving environment. The presence of separable multipaths has been found to occur mostly at very low signal-to-noise ratios, with the highest number of multipaths occurring in an urban canyon environment. In one example, the value of N is set to four. It may be desirable to set the value of P to at least (N+1).

It may be desired to select different numbers of peaks from different bins, e.g. based on past search results. In some implementations, for example, values of parameters P and/or N may vary from bin to bin. For example, one or more bins may be excluded from process M100 by selecting zero peaks for such bins in task T120. Tasks T110 and T120 may be performed serially and/or in parallel.

Task T130 may return a sorted list of the P largest peaks of the bin. For example, task T130 may sort each peak list and forward the sorted peak lists to another task for further processing. In one example, process M100 may be performed by a first array of logic elements (e.g. an embedded processor) according to a firmware program, and task T130 may pass the sorted bin lists to a second array of logic elements (e.g. a microprocessor) for further processing according to a software program. Sorting of the bin peak lists may already be accomplished with the completion of task T120, as a peak list may be sorted as each peak is selected.

Figure 11:
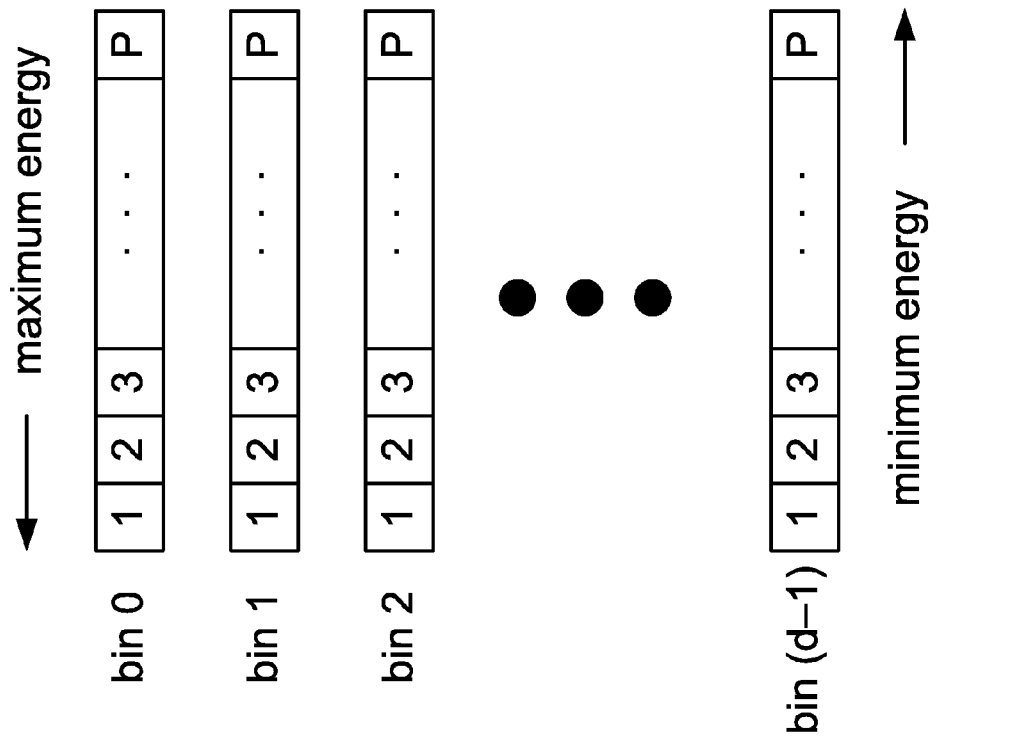
FIG. 11 is a schematic diagram representing a set of sorted lists of peaks in one particular implementation.

FIG. 11 shows a set of d lists of peaks as may be created by an implementation of process M100. Each list corresponds to one of the bins 0 to (d-1), and each list entry indicates an energy result and is associated with a code phase hypothesis. Each list is sorted by energy in decreasing order of magnitude.

Figure 12:
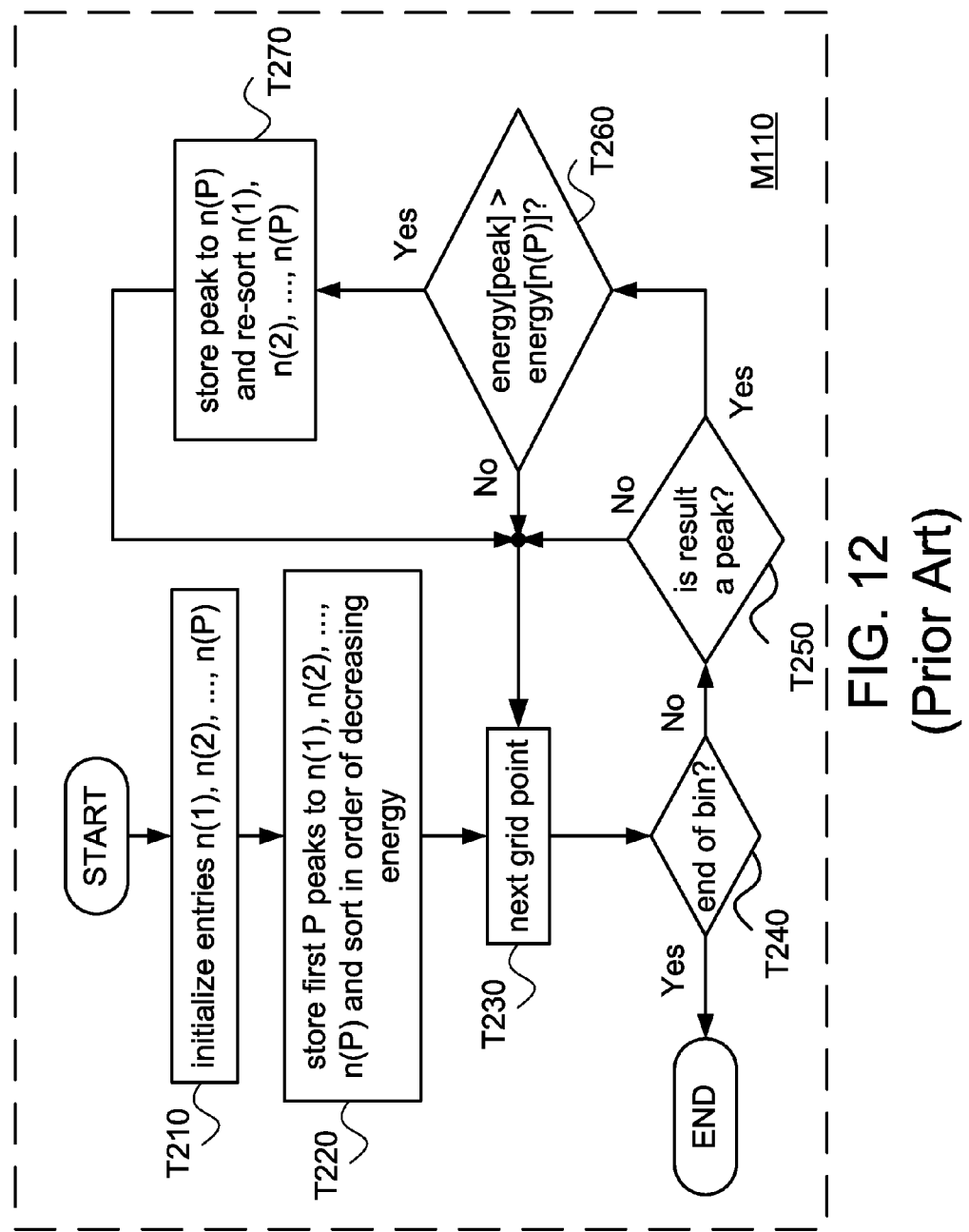
FIG. 12 is a flow diagram illustrating a process for identifying peaks in a Doppler bin in one particular implementation.

FIG. 12 is a flow diagram of a particular implementation of process M100. Task T210 may initialize a set of entries n(1) to n(P), each entry being configured to indicate a code phase and a corresponding energy result. Task T220 may store the first P peaks to n(1)-n(P), and sort the entries by energy in decreasing order of magnitude. Tasks T230 and T240 are loop maintenance tasks that cause process M100 to proceed through grid points in the bin. Task T250 may determine whether the energy result at the current grid point is a peak. For example, task T250 may determine whether the energy result is a local maximum in code phase and in frequency (or, alternatively, in one or the other dimension). If the result is a peak, task T260 compares the energy value of the peak to that of n(P). If the energy value of the peak is greater than n(P), task T270 replaces entry n(P) with the peak and re-sorts the entries n(1)-n(P) by energy in decreasing order of magnitude.

In one application, process M110 may be performed by a module (e.g. a search processor, which may be an array of logic elements such as a dedicated or embedded processor) according to a routine in firmware, and the resulting list is stored or otherwise made available to another module (e.g. an array of logic elements such as a microprocessor) for further processing according to a routine in software.

In addition to one or more valid peaks, an energy grid may include peaks from interfering signals such as one or more jammers and/or cross-correlations. As shown in the example of FIG. 9, a jammer may cause enough peaks with higher energies than a valid peak to flood a reasonably sized list of maximum peaks, thus preventing the valid peak from being located. A set of peak bin lists as created by process M100 may provide information about peaks in more than one Doppler bin. At least some implementations of process M100 may be applied to support rejection of one or more corrupted bins and successful location of the signal. At least some implementations of process M100 may be applied to advantage with code phase search windows that are extended (possibly dynamically) in at least the code phase dimension, reducing the likelihood of losing a valid peak in one bin because of large numbers of peaks due to jammers in one or more other bins.

Figure 13A:
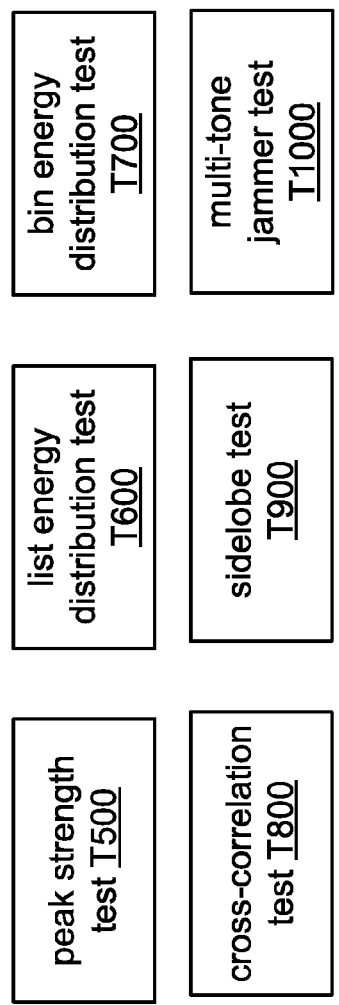
FIG. 13A is a schematic diagram showing tasks that may be performed in connection with lists of peaks in particular implementations.

FIG. 13A shows examples of additional tasks that may be performed on the bin lists produced by process M100 and/or on the peaks in those lists. Peak strength test task T500 may compare an energy value of at least one peak in the list to a minimum value relating to a noise level. List energy distribution test task T600 may test a distribution of energy among peaks in the list. Bin energy distribution test task T700 may compare an energy value of one or more peaks to a noise measure for the bin.

Particular implementations may include combining aspects of process M100 with a bin culling procedure, in which one or more of frequency hypotheses may be rejected (e.g., not considered during further processing operations) based, at least in part, on outcomes of one or more of tasks T500, T600, and T700. Alternatively, any of tasks T500, T600, and T700 may be applied on a peak-by-peak basis, such that rejection of a peak does not prevent another peak from the same bin from being considered. Other tests that may be conducted on the peaks in the bin lists include cross-correlation test task T800, which may reject peaks likely to be due to cross-correlations with other codes, and sidelobe test task T900, which may reject peaks that are likely to be sidelobes of another peak.

As illustrated below according to one particular implementation, a multi-tone jammer test task T1000 may detect a presence of a multi-tone jammer in detected energy peaks and affect processing of such energy peaks upon detection of such a presence of a multi-tone jammer. For example, task T1000 may be performed following test tasks T500 through T900. As pointed out above with reference to FIG. 7A, a single-tone jammer may have a substantially uniform energy profile at a particular frequency across code phase hypotheses in a substantially uniform "ridge." Embodiments illustrated below may detect the presence of a multi-tone jammer having a non-uniform energy profile across code phase hypotheses (e.g., sinusoidal as shown in FIG. 7B) at about a particular frequency, and alter processing of energy peaks accordingly.

Figure 13B:
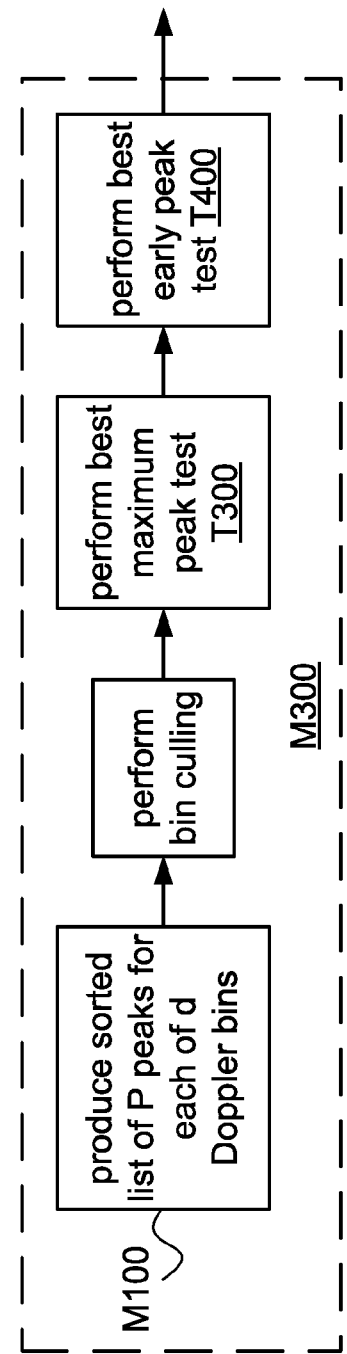
FIG. 13B is a flow diagram illustrating a process to analyze information in a list of peaks in a Doppler bin chart in a particular implementation.

FIG. 13B is a flow diagram illustrating a process M300 according to a particular implementation. Here, a bin culling procedure may include one or more of peak strength test task T500 and list energy distribution test task T600. Best maximum peak test T300, which is adapted to select the most likely valid maximum peak from among the surviving bins, may include tasks such as bin energy distribution test task T700, cross-correlation test task T800, and/or sidelobe test task T900. Best early peak test T400, which is adapted to determine a presence of a more direct multipath related to the best maximum peak, also may include tasks such as bin energy distribution test task T700, cross-correlation test task T800, and/or sidelobe test task T900. Process M300 may return a Doppler offset and/or a location in code phase that may be used to compute a pseudorange.

Figure 14A:
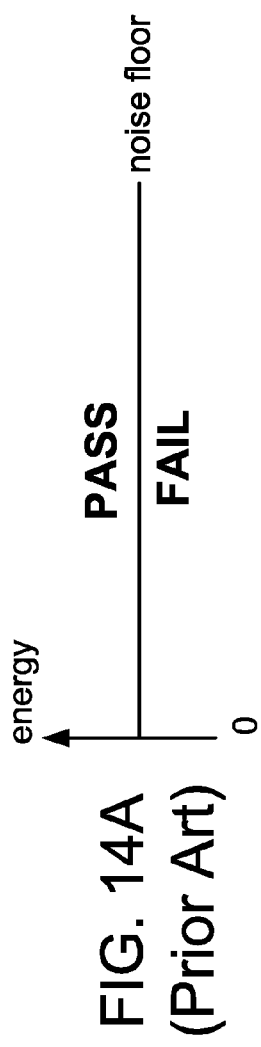
FIG. 14A is a diagram illustrating pass and fail criteria in connection with a peak strength test according to a particular implementation.

A culling procedure may include, for example, discarding a bin if it is determined that the peaks in the corresponding bin list are not sufficiently distinct from a noise floor. An implementation of peak strength test task T500 may compare an energy value of the first maximum peak in the list n(1) to a minimum value L1. Value L1 may be based, at least in part, on the noise floor. For example, L1 may be the value of the noise floor, or L1 may be the sum of the noise floor and a threshold value T1, or L1 may be a value that is calculated as a percentage (e.g. 110%) of the noise floor. It should be understood, however, that these are merely examples of how such a minimum peak value may be determined based, at least in part, on a noise floor and claimed subject matter is not limited in this respect. A value of a noise floor may be measured (for example, as obtained using a discrete level detector or by digital analysis of the received sample stream) or predicted (for example, based on theory assuming the absence of jammers). The noise floor value may also depend upon one or both of the coherent and non-coherent integration times. If energy of a first peak is less than L1, for example, energies of other peaks in the sorted list may also be deemed to fall below this value, and the bin can be discarded without further testing. FIG. 14A shows an example of the pass and fail criteria applied in such a test in which the energy value of a peak is compared to the noise floor.

Figure 14B:
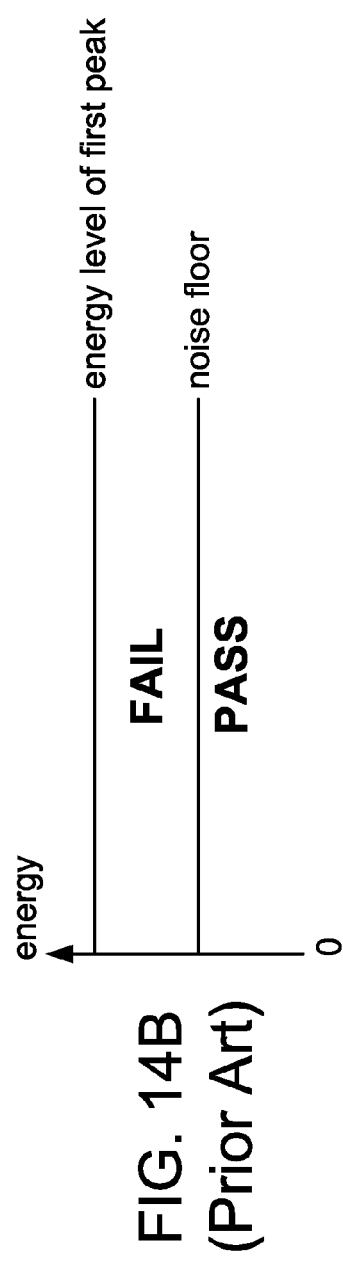
FIGS. 14B and 14C are diagrams illustrating pass and fail criteria in connection with a list energy distribution test according to a particular implementation.
Figure 14C:
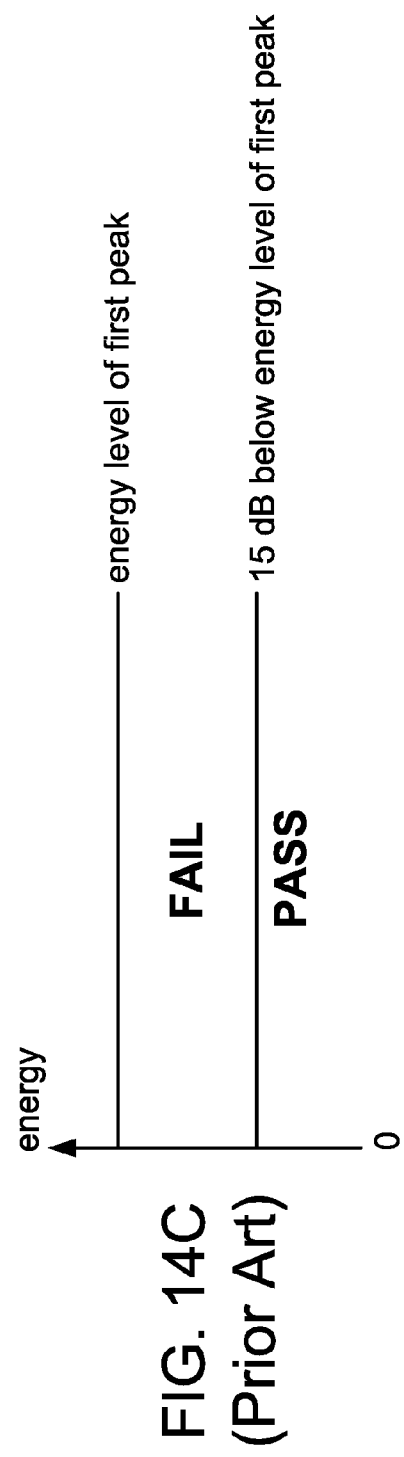
Figure 15:
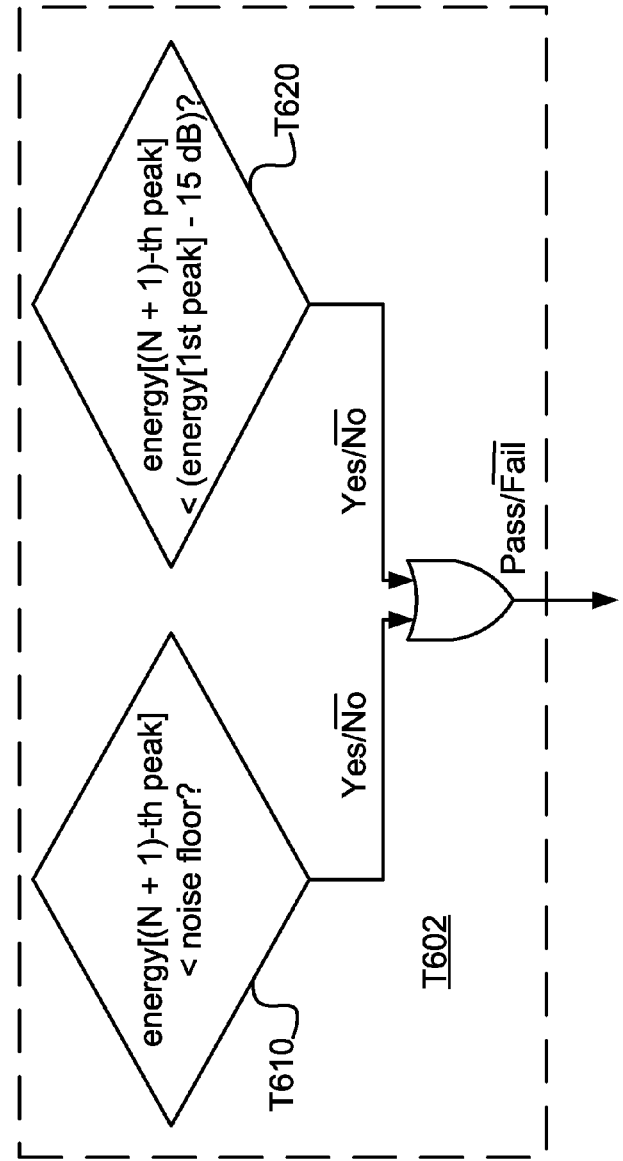
FIG. 15 is a flow diagram illustrating a process to for conducting a list energy distribution test according to a particular implementation.

In a culling procedure, distribution of energy among peaks in a bin list is considered. In one implementation, such a procedure may reject a bin if the corresponding bin list contains too many valid peaks. Alternatively, instead of rejecting a bin under such a condition, a culling procedure may merely flag and/or identify the bin as being suspicious, allowing task T720 (see FIG. 18A) to make a decision as to whether a bin should be rejected based on other information, for example. In a particular implementation where the bin list is ordered, testing of the (N+1)-th peak may be sufficient to establish whether the bin satisfies the criterion of having no more than N valid peaks. FIG. 15 shows a flow diagram of a process T602 in a particular implementation of list energy distribution test task T600 that includes a two-part test on the energy of the (N+1)-th peak in a bin list. In one aspect, task T610 may compare energy of the (N+1)-th peak to a minimum value L2 that may be based, at least in part, on a measured or predicted noise floor value. For example, L2 may comprise a value of the noise floor, or L2 may comprise the sum of the noise floor and a threshold T2 (where T2 may be equal to T1), or L2 may comprise a value that is calculated as a percentage (e.g. 110%) of the noise floor. It should be understood, however, that these are merely examples of how L2 may be determined according to particular implementations and that claimed subject matter is not limited in this respect. Task T610 may register a pass if the energy of the (N+1)-th peak is below the minimum value L2. FIG. 14B shows an example of the pass and fail energy criteria for an implementation of task T610, for example.

In another portion of peak energy distribution test task T602, task T620 may compare a difference between energy values of the first and (N+1)-th peaks in the bin list to a threshold T3. Here, it may be desirable to select a value of T3 that is low enough to avoid separating peaks of a jammer ridge from one another, but high enough to prevent peaks from unrelated phenomena (such as an auto-correlation sidelobe) from being identified as valid and thus causing the bin to be discarded. A worst-case separation between an autocorrelation mainlobe and sidelobe for a GPS C/A code is 21.6 dB, and in one example, the value of T3 is set to 15 dB to allow a margin for variation and error. If a difference between the energy values of the first and (N+1)-th peaks is less than 15 dB, in a particular implementation for example, it may be assumed that the (N+1)-th peak is not due to an auto-correlation sidelobe, and the bin is rejected for having too many valid peaks.

If the (N+1)-th peak is below the noise floor, for example, it may be determined that the associated bin has no more than N peaks above the noise level. If the (N+1)-th peak is above the noise floor but more than a threshold value below the maximum peak, for example, then it may be due to an auto-correlation sidelobe and thus be invalid, such that the bin still has no more than N valid peaks. In either case, a number of valid peaks in the bin is sufficiently limited to support the conclusion that the bin is not corrupted by a jammer. If the peak fails both tests (i.e. it is a valid peak), however, it may be determined that the bin contains too many valid peaks and it is discarded. In particular implementations, tasks T610 and T620 may be performed in parallel or in either order, and either test may be skipped once the other has failed. In other implementations, one or both of tasks T610 and T620 may be configured according to an alternate logic. For example, the tasks may be configured such that a peak above the noise floor passes test task T610, a peak within the threshold passes test task T620, and passing both tests indicates a valid peak.

Figure 16:
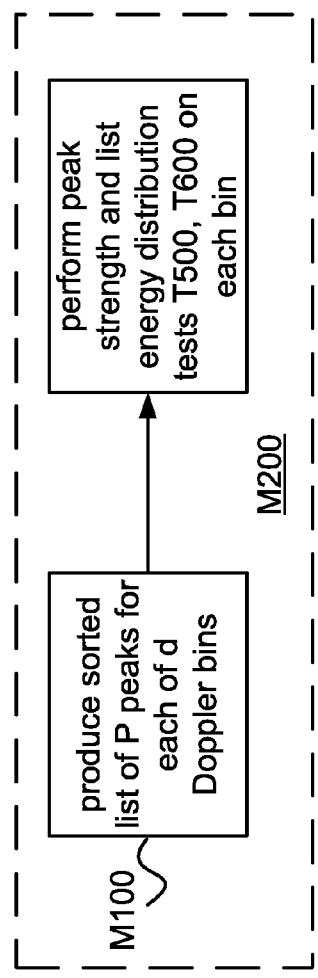
FIG. 16 is a flow diagram illustrating a process to perform tests on peak energy associated with a Doppler bin according to a particular implementation.

A potential advantage of performing a peak strength test according to an implementation of task T500 and a list energy distribution test according to an implementation of task T600 is that a decision on whether to keep or exclude the entire bin may be made based on examining only two of the peaks of the list created by method M100. FIG. 16 shows a flow diagram illustrating a process M200 according to a particular implementation that includes implementations of process M100 and tasks T500 and T600.

Another potential advantage of a list energy distribution test according to an implementation of task T600 is that such a test may exclude bins that have strong peaks due to cross-correlations with different codes. In a particular example, while a cross-correlation between two different GPS C/A codes may not produce a ridge like a jammer, nevertheless peaks caused by such a cross-correlation may be distinguished from those of a valid signal due to their periodicity in code space. Because of this periodicity, strong peaks due to such a cross-correlation may cause the number of valid peaks to exceed the maximum allowable number of multipaths N. Chances of excluding a cross-correlation bin as a jammer may increase as code phase search window size increases (e.g., to include more periods of the cross-correlation function). Other implementations may include applying knowledge of which SVs are currently visible to identify the periods and/or Doppler frequencies of likely cross-correlations, determining whether peaks matching such criteria are present in the grid, and rejecting such peaks or their bins.

Figure 17:
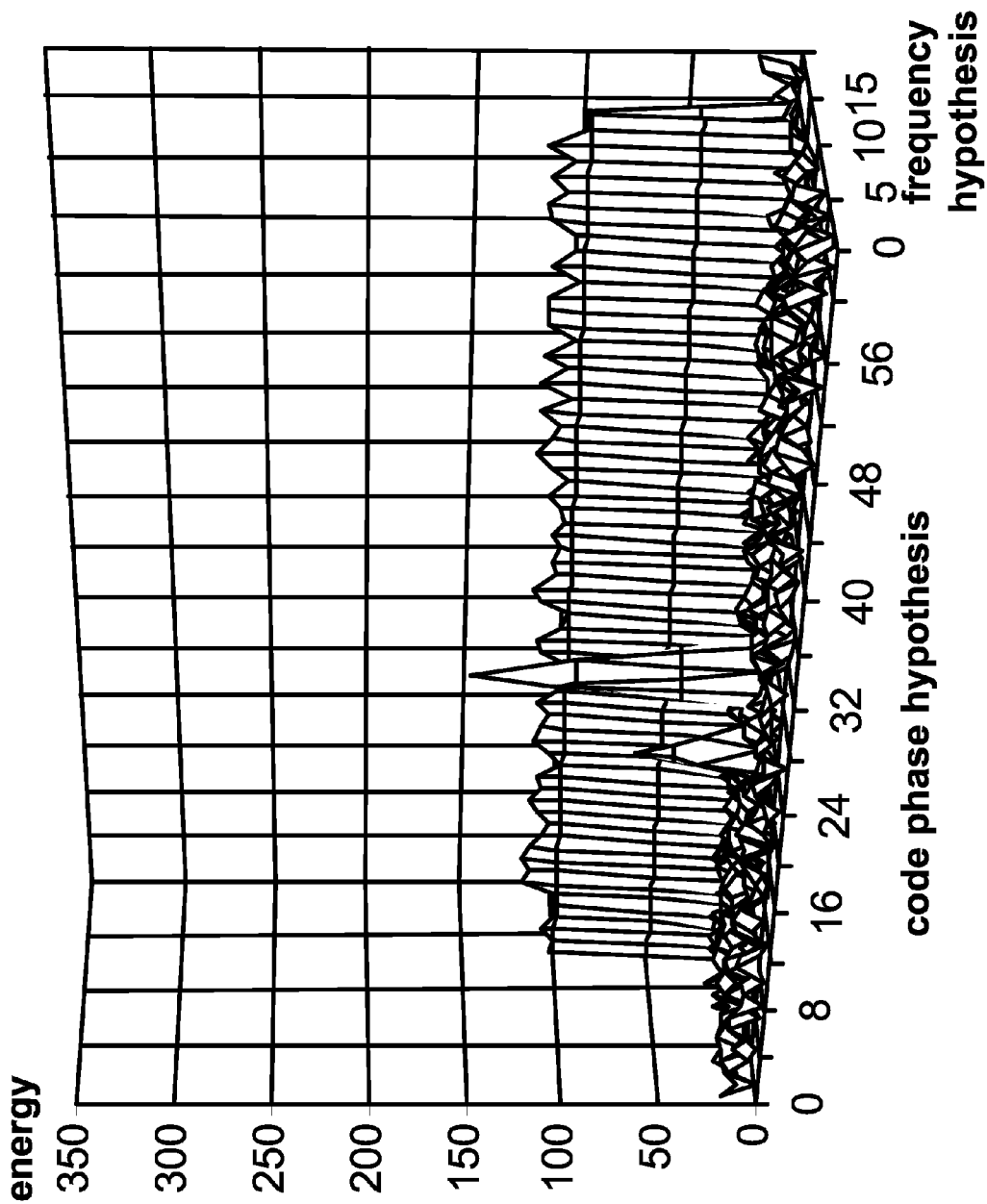
FIG. 17 is an energy plot showing energy peaks due to multipath signals and an energy ridge in a particular example.

A potential advantage of at least some implementations of processes described herein is that even if several or many bins of the energy grid are corrupted by jammers, a valid peak in another bin can still be found. Even for a code phase search window that is very large in code space, such that a jammer may cause a large number of energy peaks, processes according to a particular implementation may be used to support rejecting the jammer peaks early in the processing cycle by removing the corrupted bins from consideration, while supporting subsequent identification of a valid peak by preserving a number of peaks for each of the other of d bins. FIG. 17 shows one example of an early multipath that might thus be detected even in the presence of an overwhelmingly strong jammer ridge A strong jamming signal may impart other undesirable effects on a receiving device's operation. In particular implementations, a receivers may employ some form of automatic gain control (AGC) to increase amplifier gain if a received signal is weak and to reduce amplifier gain if a received signal is strong (e.g., to maintain the signal level within a dynamic range of the ADC(s)). A strong jamming signal may cause the AGC to reduce the gain enough to push a valid signal peak below the noise floor. In some cases, a jammer may be the dominant source of in-band energy. While AGC could be disabled or otherwise inhibited upon detection of such a jammer (e.g. during bin culling), increasing signal level in this manner may cause the signal to become clipped. In a further embodiment, frequency bands corrupted by jammers are removed from the incoming signal. For example, one or more bandstop filters may be selectably configured to attenuate an RF band in which a jammer has been detected. Such attenuation may be performed on the signal in the analog domain and/or digitally. In one implementation, a selectable attenuation is performed on a high-dynamic-range digital signal (e.g. 12 to 18 bits) before the signal is converted to a lower resolution (e.g. 4 bits) for further processing.

Further processing may be performed on the peak bin lists subsequent to an implementation of process M100 or M200. For example, procedures such as those described in U.S. Pat. No. 7,127,011, by Douglas Rowitch, titled "Procedure for Jammer Detection" may be applied to the peaks in the lists or surviving lists.

In one particular implementation, bin energy distribution test task T700 may process a set of bin lists to identify a best maximum peak. FIG. 18A is a flow diagram of an implementation T702 of task T700, which is adapted to return a best maximum peak among the bin lists. This particular implementation, which includes one or more tests, may iterate through a list of maximum peaks until a peak that passes the tests is found. Implementations of cross-correlation test task T800 and/or sidelobe test task T900 as described herein may be integrated into other implementations of task T700.

Peak selection task T710 may create a list of maximum peaks from the bin lists by selecting a peak having highest energy from each bin list (or from each surviving bin list, if bin culling has been performed). Task T710 may also sort peaks in this list by their energy values (e.g., in decreasing order). In some applications, task T710 may be implemented to select and list more than one peak from one or more bins. Loop initialization task T720 may select a peak having highest energy in the list as the current peak for testing, for example.

Even if a current peak is above a noise floor value, an associated bin may be corrupted by noise such that the current peak is unreliable. For the current peak, noise estimation task T730 may obtain a measure of average noise energy for the associated bin. This noise energy measure, which may be referred to as a mean measured noise estimate, may be calculated as an average energy of non-peak samples of the bin.

In one particular implementation, task T730 may comprise calculating an energy sum for a bin, subtracting the energy due to peaks, and dividing the resulting sum by the number of values in the bin less the number of subtracted values. Here, peaks to be subtracted may include only those peaks that appear in the bin list or may also include other local maxima that have an energy value above some threshold. In one example, the peaks to be subtracted include local maxima that are above the noise floor and within 15 dB of the maximum peak in the bin. Subtracting the energy due to peaks may also include subtracting the energy values of grid points in the bin that are adjacent to peaks, such that three values are subtracted from the bin for each peak. In some implementations, an average noise energy measure may be calculated and provided by a searcher with an associated bin list.

A ratio between the energy value for a peak due to a jammer and a noise estimate for an associated Doppler bin may be much smaller than a ratio between an energy value for a valid peak and a noise estimate for the associated Doppler bin. Ratio test task T740 may compare an energy value for a current peak to an average noise energy for the bin. If the ratio between these values is less than (or equal to) a threshold T4, the peak may be is rejected. If a maximum peak in a bin fails this test, then all other peaks in the bin may fail as well and may be ignored.

Threshold T4 may be fixed or variable. For example, a value for T4 may be selected according to a particular period of coherent integration and/or the number of non-coherent integrations. The following Table 1 shows one example of a set of different values of T4:

TABLE 1

| Coherent integration (milliseconds) | Non-coherent integrations | Total integration time (milliseconds) | T4 (in dB) |
|---|---|---|---|
| 20 | 4 | 80 | 16.832 |
| 20 | 44 | 880 | 13.718 |
| 80 | 22 | 1760 | 15.494 |

Task T700 may also include a coarse jammer detection task T750, which may reject a bin if a total number of energy values that were subtracted from the bin to obtain the average noise energy measure exceeds a threshold T5. In one particular example, T5 may be set to a product of the number of energy values subtracted from the bin for each peak (three, in the example above) and a maximum allowed number of multipaths N.

According to an embodiment, a single-tone jammer signal may be modeled as s(t) according to relation (6) as follows:

$$s(t) = A_0 e^{-j2\pi f_0' t}, \qquad (6)$$

Where:
$A_0$ is the tone amplitude; and
$f_0$ is the frequency of the single tone relative to a carrier frequency.

Received jammer signal s(t), may be processed at a receiver by, for example, correlation with a C/A code represented by signal c(t) and modeled as a Fourier series according to relation (7) as follows:

$$c(t) = \sum_{n=-\infty}^{\infty} a_n e^{-j2\pi(1000n)t}. \qquad (7)$$

Here, a correlation filter output signal $y_0(t)$, prior to non-coherent operation, may be represented according to relation (8) follows:

$$\begin{aligned} y_0(t) &= (s(t)e^{j2\pi f_a t}) * c^*(-t) \qquad (8) \\ &= (A_0 e^{-j2\pi f_0' t}) * \left( \sum_{n=-\infty}^{\infty} a_n^* e^{-j2\pi(1000n)t} \right) \\ &= A_0 \int_{-\infty}^{\infty} e^{-j2\pi f_0' \tau} \sum_{n=-\infty}^{\infty} a_n^* e^{-j2\pi(1000n)(t-\tau)} d\tau \\ &= A_0 \sum_{n=-\infty}^{\infty} a_n^* e^{-j2\pi(1000n)t} \int_{-\infty}^{\infty} e^{-j2\pi(f_0'-1000n)\tau} d\tau, \\ &= A_0 \sum_{n=-\infty}^{\infty} a_n^* e^{-j2\pi(1000n)t} \delta(f_0' - 1000n) \\ &= \begin{cases} 0 & f_0' \neq 1000K \\ A_0 a_K^* e^{-j2\pi f_0' t} & f_0' = 1000K \end{cases} \end{aligned}$$

for some integer K, where $f_o$ denotes a carrier frequency and $f_a$ denotes a receiving end rotator frequency, $f_0' = f_0 - f_a$ and where $\delta(x) = 1$ if $x = 0$ and is zero otherwise. In a particular implementation, applying finite windowing functions in time, a single tone jammer may be detectable over a range of frequencies as a function of coherent integration length. In a particular embodiment where $f_0' = 1000K$ for some K, integrating using a non-coherent squaring operation we obtain y(t) according to relation (9) as follows:

$$y(t) = \|y_0(t)\|^2 = y_0(t) \cdot y_0^*(t) \quad (9)$$
$$= A_0^2 \|a_K\|^2,$$

Thus, at frequency offset $f_0'$, there is a DC component independent of time. This is illustrated in FIG. 7A where jammer energy is located at about a one frequency in a static ridge and offset over all code phase hypotheses. As illustrated above, such a DC component in a Doppler bin may be detected using tests such as, for example, peak number test task T602 (e.g., counting a number of valid peaks in a Doppler bin) illustrated in FIG. 15, ratio test task T740 (e.g., comparing an energy value of a current peak to the average noise energy for a bin) illustrated in FIG. 18A and/or course jammer detection task T750 (e.g., determining a whether a total number of energy values subtracted from a bin to obtain an average noise measure exceeds a threshold) illustrated in FIG. 18A. As illustrated above upon detection of a single tone jammer using one or more of these techniques, associated Doppler bins may be rejected. In the case of a multi-tone jammer, on the other hand, these tests, by themselves, may not be effective at detection of a multi-tone jammer and rejection of associated energy.

In a particular example, a multi-tone jammer may provide a signal having energy in multiple tones and/or frequencies. A two-tone jammer, a particular example of a multi-tone jammer, may have any one of several profiles characterized by a primary tone or frequency, secondary tone or frequency, strength of secondary tone relative to primary tone. Table 2 below provides examples of such profiles. It should be understood, however, that these are merely particular examples of profiles of a multi-tone jammer provided for illustration, and that claimed subject matter is not limited in this respect.

TABLE 2

| Approx. Freq. Offset (kHz) | Primary Tone (kHz) | Secondary Tone (kHz) | Actual Freq. Offset (kHz) | Sec Tone Relative Strength (dB) | Cycles Per 32 Chip Interval (approx.) |
|---|---|---|---|---|---|
| 8 | 123 | 131 | 8 | −5.0415 | ¼ |
| 16 | 123 | 107 | 16 | −5.4227 | ½ |
| 32 | 123 | 92 | 31 | −6.785 | 1 |
| 64 | 123 | 60 | 63 | −10.4891 | 2 |

A multi-tone jammer may also be characterized according to a function. In a particular example, a multi-tone jammer signal may be modeled as s(t) according to relation (10) as follows:

$$s(t) = \sum_{m=0}^{M-1} A_m e^{-j2\pi f_m t}, \quad (10)$$

Where:
$f_m$ represents the frequency of a single mth tone of the multi-tone jammer, relative to a carrier frequency; and
$A_m$ represents the tone amplitude of the mth tone of the multi-tone jammer.
In a particular embodiment where $\{f_m'\}$ are equal to some multiple of 1 kHz, then a correlation of multi-tone jammer signal s(t) as set out in relation (10) with a C/A code represented by signal c(t) may be modeled as a Fourier series according to relation (11) as follows:

$$y_0(t) = \sum_{m=0}^{M-1} A_m a_{K_m}^* e^{j2\pi f_m' t}, \quad (11)$$

for some $K_i \neq K_j$, $\{i,j\} \in \{0, \ldots, M-1\}, i \neq j$.

Integrating $y_0(t)$ for a multi-tone jammer as expressed in relation (11) using a non-coherent squaring operation may provide y(t) according to relation (12) as follows:

$$y(t) = \|y_0(t)\| = y_0(t) \cdot y_0^*(t) \quad (12)$$
$$= \sum_{m=0}^{M-1} A_m^2 \|a_{K_m}\|^2 +$$
$$\sum_{m=0}^{M-1} \sum_{n=0, n \neq m}^{M-1} A_m A_n \mathrm{Re}\left[a_{K_m} a_{K_n}^* e^{-j2\pi(f_m'-f_n')t}\right].$$

Letting $a_{K_m} a_{K_n}^* = \alpha_{mn} e^{-j\beta_{mn}}$, then y(t) may be reduced according to relation (13) as follows:

$$y(t) = \quad (13)$$
$$\sum_{m=0}^{M-1} A_m^2 \|a_{K_m}\|^2 + \sum_{m=0}^{M-1} \sum_{n=0, n>m}^{M-1} 2 A_m A_n \alpha_{mn} \cos(2\pi (f_m' - f_n')t + \beta_{mn}).$$

Here, it should be observed that y(t) includes both a DC component and a time varying component. In a particular embodiment where a multi-tone jammer is a two-tone jammer (e.g., setting M=2), y(t) may be reduced according to relation (14) as follows:

$$y(t) = A_0^2 \|a_K\|^2 + A_1^2 \|a_J\|^2 + 2 A_0 A_1 \alpha \cos(2\pi (f_0' - f_1')t + \beta). \quad (14)$$

Here, component $2A_0 A_1 \alpha \cos(2\pi(f_0'-f_1')t+\beta)$ in relation (14) comprises a time varying, sinusoidal component having a frequency of $(f_0'-f_1')$ cycles per second. This is illustrated according to a particular example where a two-tone jammer results in a series of peaks having sinusoidal energy (e.g., as a sinusoidal ridge) located at a corresponding frequency offset over all code phase hypotheses. Due to this sinusoid ridge, and without additional processing, a two-tone jammer may pass one or more jammer detection tests outlined above (e.g., tasks T602, T740 and T750).

As illustrated above according to an exemplary implementation in FIG. 4, a code phase search window may comprise a fixed and/or set number of code phase hypotheses. In a presently illustrated embodiment, such a code phase search window may comprise thirty-two code phase hypotheses, each code phase hypothesis corresponding with an associated chip in a C/A reference code, for example. However, this is merely an example of a code phase search window according to a particular implementation and claimed subject matter is not limited in this respect.

As illustrated in FIG. 7B and relation (14), a multi-tone jammer may generate an energy profile along a Doppler bin that varies substantially as a sinusoid over code phase hypotheses. In a particular example shown in FIG. 7C, such an energy profile may have a period of about sixty-four chips. However, this is merely an example of the period of such a sinusoidal energy profile provide for the purpose of illustration, and claimed subject matter is not limited in this respect.

Also, such a sinusoidal energy profile of a multi-tone jammer may have an unknown phase with respect to boundaries of a code phase search window. Here, it should be observed from relation (14) that the sinusoidal jammer energy shown in FIGS. 7B and 7C may have an unknown and/or random phase. If peaks from such a sinusoidal energy profile are detected only at about the boundary of a code phase search window, additional processing beyond the aforementioned tasks T602, T740 and T750 may be used to determine whether such energy peaks represent valid correlation peaks or merely jammer energy that only appears at the boundary of a code phase search window.

Figure 7C:
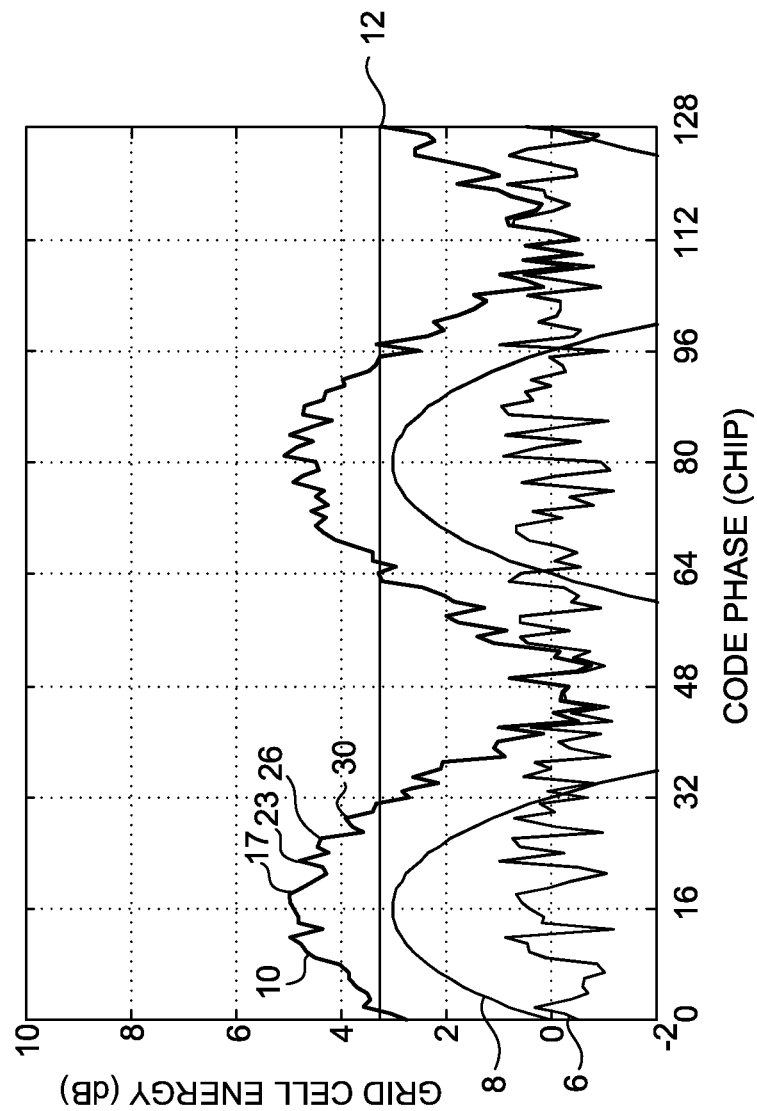

In the particular example of FIG. 7C where a code phase search window is about ½ the period of the sinusoidal jammer energy and a code phase search window positioned to extend thirty-two chips and/or code phase hypotheses from chip 0 to chip 32, a sinusoidal peak is located in about the center of the code phase search window. As such jammer plus noise signal 10 extends above detection threshold 12 such that a peak may be detected at about chip or code phase hypothesis 17. Here, one or more of the aforementioned tasks T602, T740 or T750 may be capable of detecting a presence of such a jammer in a Doppler bin, enabling rejection peaks in the Doppler bin attributable to the jammer.

In contrast, if a code phase search window instead extends from chip 32 to chip 64, jammer plus noise signal 10 (e.g., signal 8 plus signal 6) does not exceed detection threshold 12 in any portion of this range, resulting in no detection of a peak. Over this particular search window, accordingly, the presence of the jammer may not affect detection of valid correlation peaks associated with a true code phase.

In a particular example where a code phase search window extends from chip 16 to chip 48, jammer plus noise signal 10 peaks at about the lower boundary of this code phase search window. Here, four local maximum peaks may be detected above detection threshold 12 with decreasing energy at about chips 17, 23, 26 and 30. As such, the strongest peak is detected at about chip 17. While there are detections of local maximums with decreasing energy at range bins above code phase bin 17, there are no detections of any local maximums with lower energy at code phase bins in the code phase search window prior to code phase bin 17. Here, for example, tasks T602 and T750 may fail to detect this jammer in this code phase search window because there are less than N valid peaks. Thus, insufficient cells are excluded from noise calculations. Additionally, task T740 may also fail to detect the presence of such a jammer since noise estimation is still low due to cells in chip 32 to 48. Accordingly, it is inconclusive as to whether a peak detection occurs at code phase bin 17 (since portions of jammer plus noise signal 10 from chips 0 to 16 are not detectable in this particular code phase search range). In this particular example, aforementioned tests at tasks T602, T740 or T750 may not detect a presence of a jammer, and treat the peak detection at code phase bin 17 as being a valid correlation peak.

Referring to FIG. 18A according to a particular implementation, a peak detected in energy from a two-tone jammer may pass tests at tasks T740 and T750 under certain conditions as discussed above (e.g., when the peak energy is detected only at code phase search window boundaries). To avoid false detection of such energy from a two-tone jammer as a valid correlation peak, a detected energy peak may be further evaluated to confirm that such a detection is valid or whether processing is to be altered to address the possible presence of a multi-tone jammer. Here, upon passing the aforementioned tests at tasks T602, T740 and T750, as determined at diamond T760, task T780 may identify the current peak as the best maximum peak if in accordance with task T775 the current peak is determined to not be near a window boundary. Task T775 may calculate spacing between energy peaks in a Doppler bin of the identified best maximum peak so that additional processing at task T1000 (see FIGS. 13A and 18B) may detect a presence of a multi-tone jammer and/or alter or affect processing based upon such a detection (Task 785). Task T770 selects a peak with next highest energy if all the tests are not passed in accordance with task T760, and as shown in FIG. 18A task 702 then returns to task 730.

A process shown in FIG. 18B may execute at least a portion of multi-tone jammer test T1000 according to a particular implementation, although claimed subject matter is not limited in this respect. Such a process may be initiated at task T1002 upon completion of sidelobe test T900, for example. Task T1004 may determine whether a best maximum peak (e.g., as determined at task T780) is near a boundary of a code phase search window to determine whether the best maximum peak is a valid detection or whether processing should be altered. For example, if peak energy is detected within a set number of code phase hypotheses and/or chips of a boundary of a code phase search window, additional and/or different processing may be performed. In the particular implementation illustrated in FIG. 18B, task T1004 determines whether detected peak energy is within a range of four code phase hypotheses and/or chips of a boundary of a code phase search window. In other implementations, however, task T1004 may determine whether detected peak energy is within a range of more or fewer code phase hypotheses from a boundary of a code phase search window. While using such a range with a greater number of code phase search hypotheses may improve jammer detection performance, such a greater number may also reduce an effective size of a code phase search window.

In particular implementations, a receiver may be capable of employing different modes of operation to process a received signal to obtain, for example, a pseudorange measurement. In one example implementation, a receiver may attempt to take a series of multiple pseudorange measurements to an SV (e.g., over a series of multiple dwells or looks at the SV to detect a code phase). In one particular implementation, "verification search" dwell may follow an initial search dwell to confirm that energy peaks detected in an initial dwell are valid. In this particular implementation, for example, process M100 shown in FIG. 10 may be performed following completion of processing (such as processing by correlator 100 shown in FIG. 3) to obtain an energy result e(t). In this particular implementation, for example, task T1006 may determine that a verify search is permitted if determined that the maximum peak is within a range of a set number of chips of the edge of a code phase search window (e.g. at task T1004 as discussed above). Here, the phase of a sinusoidal energy profile may not change significantly from a first attempt to obtain a pseudorange measurement to a subsequent attempt. Referring again to the example above with reference to FIG. 7C, altering processing in a subsequent verification search dwell may comprise shifting or re-centering a 32-chip code phase window (see Task T1012 in FIG. 18B) bounded by chips 16 and 48 by sixteen chips. Here, the code phase search window may be shifted in the code phase dimension to a code phase bounded by chips 0 and 32 (where energy due to jammer plus noise signal 10 can be detected as a jammer using other tests and rejected as illustrated above).

As pointed out above, certain modes of operation may permit a verification search dwell while other modes of operation may not permit such a verification search dwell. Additionally certain modes of operation may only permit a single or limited number of verification search dwells following an initial search dwell. If a subsequent verification search dwell is not allowable as determined at task T1006, task T1008 may conclude that the maximum peak is the result of a multi-tone jammer if the maximum peak is obtained from the current search dwell is a verification search dwell. Alternative processing may then be initiated at task T1014 discussed below. However, if the current search dwell is not a verification search dwell, task T1008 may then initiate processing at task T1010 to evaluate where any peak detections other than the maximum peak are the result of multi-path.

As illustrated above in FIG. 18A, task T775 may calculate spacing between energy peaks in a Doppler bin of the best maximum peak. In the particular phenomenon illustrated in FIG. 7C, sinusoidal jammer energy has a period of about twice the length of a code phase search window. Alternatively, however, the period may be significantly smaller such as, for example ½ the length of a code phase search window. Here, sinusoidal jammer energy may result in multiple peaks above noise, which may be detected as a jammer by the aforementioned tasks T602, T740 or T750. In one implementation, task T1010 may detect a presence of such a jammer by determining whether adjacent detected peaks in a Doppler bin or segment are separated by more than a maximum spacing. Here, for example, such a maximum spacing may be determined based, at least in part, on a maximum spacing of a peak from a later multi-path signal and a peak resulting from a multipath signal. In one particular example, as illustrated in FIG. 18B, such a maximum spacing may be set to four chips or code phase hypotheses. However, this is merely one example of such a maximum spacing and claimed subject matter is not limited in this respect. If such a maximum spacing is less than the set number of chips or code phase hypotheses, the maximum peak may be declared valid at task T1016. Otherwise, if such a maximum spacing exceeds the set number of chips or code phase hypotheses, task T1010 may determine that the maximum peak is from a jammer and initiate alternate processing at task T1014.

In one example implementation, coherent integration time during processing to obtain an energy result e(t) during a search dwell may be variable (e.g., between 0.5 sec to 12.0 sec in steps of 0.5 sec) and shortened in response to one or more conditions such as, for example, receiving an energy peak at above a set threshold. In other words, such a process may terminate integration to obtain an energy result e(t) early and prior to a maximum integration time. In a particular implementation of task T1000 as illustrated in FIG. 18B, processing may be altered upon conclusion that a maximum peak detected is from a jammer at task T1014. Here, such altering of processing at task T1014 may comprise, for example, suspending such an early termination of integration to allow integration up to a maximum duration for obtaining an energy result e(t). Allowing integration to continue up to a maximum duration may enable detection of additional peaks that are associated with valid correlations of a reference code with an SPS signal of a particular SV being searched. Following integration time, peak spacing may be checked for detection of a jammer if peaks show a separation that is wider than a typical multi-path profile.

In addition to peaks caused by cross-correlations between the reference code and the code being searched, an energy grid may also include peaks caused by cross-correlations between the reference code and other codes. In a GPS reception scenario, for example, a received signal may include codes transmitted by as many as twelve different SVs, and an energy grid may be expected to include peaks due to cross-correlations between the reference code and the codes of several of these SVs.

In one particular example, a worst-case code separation between C/A codes may be only 21.6 dB. Cross-correlation of a reference code with a code from another SV is most likely to present a problem if the signal from the SV being searched is highly attenuated relative to that of the other SV. Such a scenario may occur, for example, if the SV being searched is near the horizon, or blocked by an obstacle, while the other SV is within a line-of-sight of the receiver. Signals from one or more pseudolites, synchrolites, or GPS repeaters may also cause a strong cross-correlation.

Because the C/A codes have a period of about one millisecond in particular embodiments, a most significant cross-correlations may occur if the difference between the interfering SV signal and the target SV signal is a multiple of 1 kHz. Information about the Doppler frequency offset of a potentially interfering SV signal may thus be used to determine an most likely location(s) of a cross-correlation with that signal in frequency space.

Figure 19:
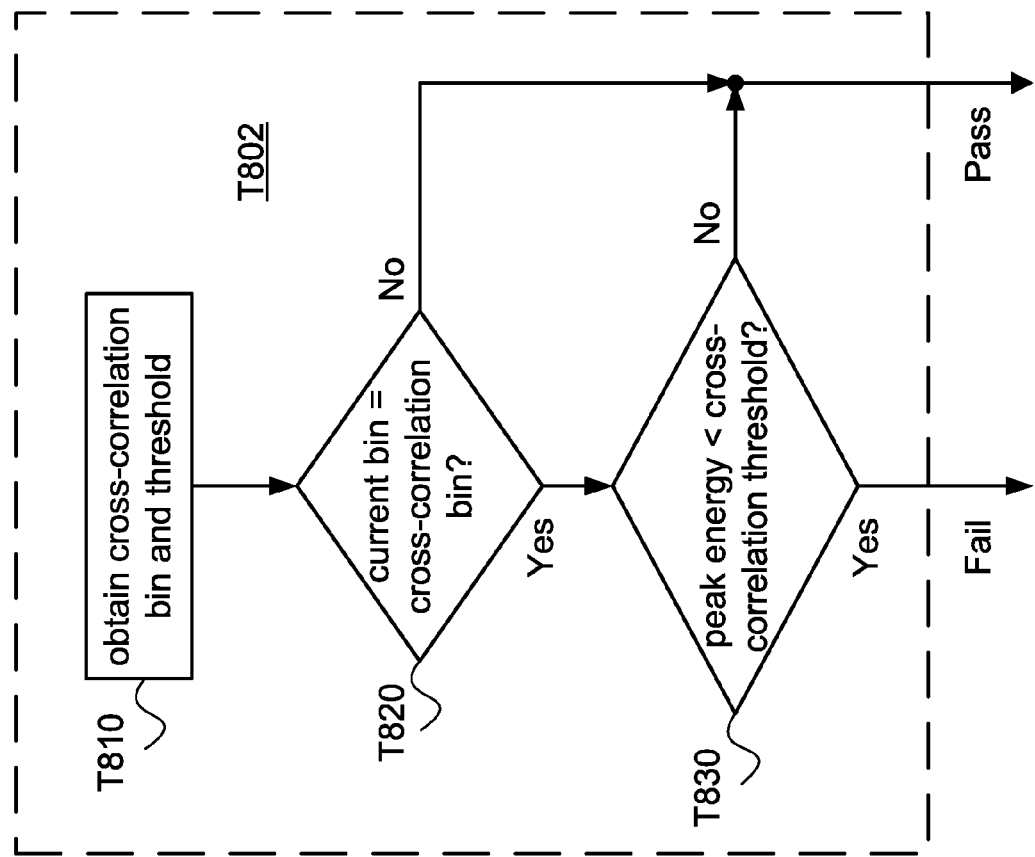
FIG. 19 is a flow diagram of a process for testing cross-correlation according to a particular implementation.

Cross-correlation test task T800 may compare an energy value and frequency hypothesis of a peak to parameters of a cross-correlation mask. FIG. 19 is a flow diagram of an implementation T802 of cross-correlation task T800. Task T810 may obtain a cross-correlation bin and threshold. Task T820 may compare bin of a current peak to the cross-correlation bin. Task T830 may compare an energy value of the current peak with the cross-correlation threshold. If a peak falls within the mask, it may be rejected as being likely a result of a cross-correlation with a signal of another visible SV. Task T802 may be iterated to test the peak against masks for one or more other SVs.

In obtaining mask parameters, task T810 may reference a lookup table containing identities and current Doppler locations of other visible SVs. This table may be based, at least in part, on information gained from past searches and/or obtained from another device such as a PDE. A difference between Doppler at the location of the current peak and Doppler at the location of the other SV may be determined, and the modulo 1 kHz remainder of this value may be calculated to indicate the cross-correlation bin. Other mask parameters such as energy value threshold, mask width in Hertz or bins, and/or the modulo divider may be based, at least in part, on an energy value associated with the signal of the other SV and/or aspects of the current search such as bin spacing and coherent and/or noncoherent integration length. For a large difference between Doppler associated with at the peak and Doppler associated with the other SV signal, a lower energy threshold may be used (e.g. due to code smearing at large Doppler offsets).

Other implementations of task T800 may be adapted to test for compound cross-correlations arising from multiple sources (e.g. more than one other SV) with additive effect. A discussion of other aspects that may be included in an implementation of cross-correlation task T800 is set forth in U.S. Published Patent Application No. 2004/0196183 (Roh, published Oct. 7, 2004), which discloses details such as masks for mainlobes, frequency sidelobes, and sample-and-hold cross-correlations (e.g. at paragraphs [0111]-[0161]).

A best maximum peak selection process may be implemented such that if a cross-correlation test is performed, the selection process has already committed to that peak. In a further implementation of task T702, for example, cross-correlation test task T800 may be performed after task T760 or T780. If task T800 discards a peak as a cross-correlation, it may be too late to select another peak from the grid.

One particular implementation of a best maximum peak test task such as T702 may include a pre-emptive cross-correlation test task, which allows for an alternative candidate. Here, task T850 may determine whether a current candidate for best maximum peak is from a suspect bin. For example, task T702 may reference a lookup table containing the Doppler offsets of other visible SVs as described above to calculate the locations of suspect bins. If the current candidate is from a suspect bin, then task T702 tags the peak as a possible cross- correlation and the search for the best maximum peak continues. In another implementation, task T702 may first determine whether a suspect bin contains more than a threshold number (e.g. 2 or 3) of other peaks, which may reinforce a determination that the bin contains peaks due to a cross-correlation. If no other acceptable candidate is found, then the tagged peak may be used. In another implementation, task T702 may enable more than one candidate peak to be sent to cross-correlation test task T800, such that another candidate will be available if the first one is rejected.

Figure 20:
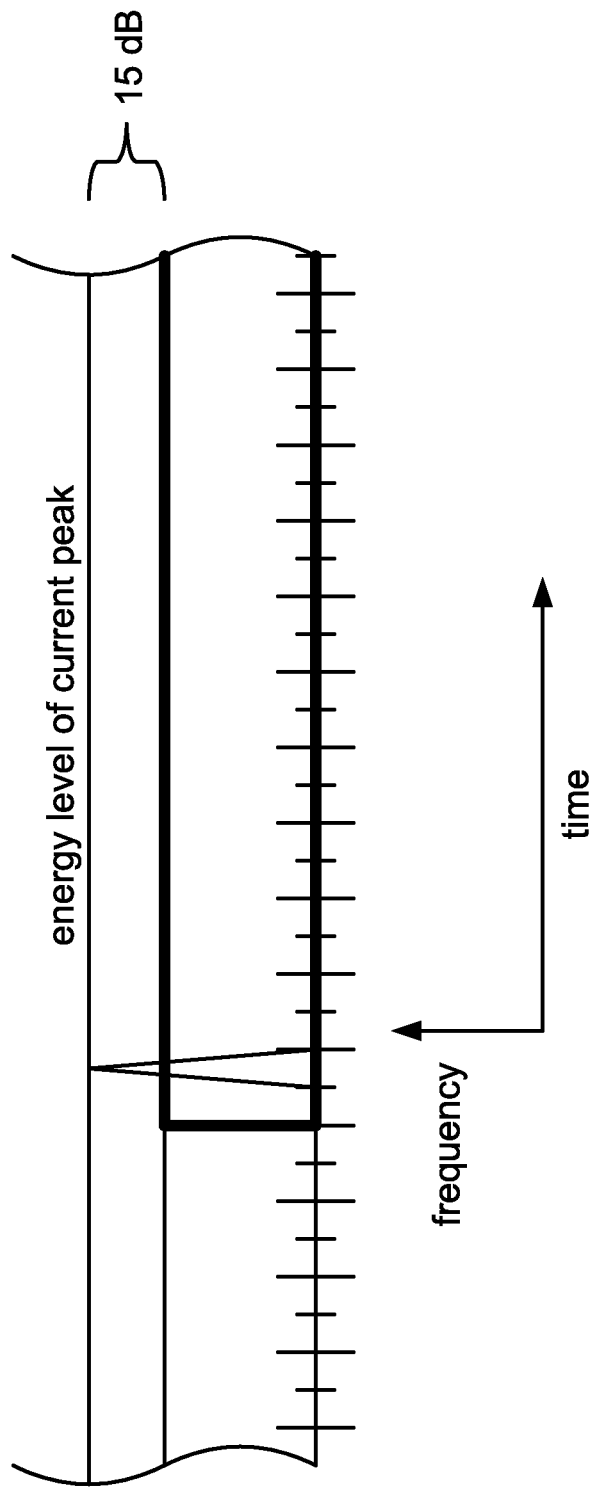
FIG. 20 is a schematic diagram showing an example of a mask as used in a particular implementation of sidelobe test.

A method according to a particular implementation may also include a sidelobe test task T900 (for example, within an implementation of best maximum peak test T300). Sidelobe test task T900 may reject candidate peaks that may be due to sidelobes of a current peak. One implementation of task T900 may apply a mask which rejects peaks associated with code phases that are later than or equal to ½ chip before that of the current peak (the time axis in the figure is marked in intervals of ½ chip), for rejection of frequency sidelobes (usually within one code hypothesis from the mainlobe) and all later peaks. Task T900 may apply such a mask to the same bin as the current peak, to a range including a few surrounding bins, or to all bins in the grid. Such a mask may also be adapted to reject other unwanted peaks, such as peaks due to autocorrelation sidelobes. In a particular implementation, sidelobes of a GPS C/A code autocorrelation function, for example, may be 21.6 dB down from mainlobe, and task T900 may apply a mask that is adapted according to a threshold including a margin for variation and error. FIG. 20 shows an example of such a mask which may reject peaks having energy values more than 15 dB below the current peak. Sidelobe test task T900 may also be implemented as a separate routine to cull peaks from a best maximum peak candidate list.

A strongest peak in a bin is not necessarily a best choice for the grid. As shown in FIGS. 6 and 17, for example, an earlier but weaker multipath may be the more accurate peak. A method according to a further embodiment includes a test for a peak due to an earlier multipath.

Best early peak test task T400 may search one or more bin lists to identify peaks that are earlier than the best maximum peak. Task T400 may limit its search to peaks associated with code phase hypotheses up to a threshold of T6 chips earlier than that of the best maximum peak. In one example, the value of T6 is eight chips. As an error of one GPS chip corresponds with a distance of about 300 m, locating an earlier peak of a multipath signal may provide a significant increase in position location accuracy.

It may also be desirable to limit a range of an early peak search to a frequency bin including a best maximum peak or, possibly, a few neighboring bins as well. Otherwise, the selected peak may be due to a cross-correlation with another code. Multipaths are most likely to occur indoors, where refraction and scattering are common. Thus, any change in Doppler due to relative movement between transmitter and receiver over the time span of the early peak search window is likely to be low anyway. Moreover, signals received indoors are also likely to be weak, and weak signal scenarios may be susceptible to cross-correlations.

Figure 21:
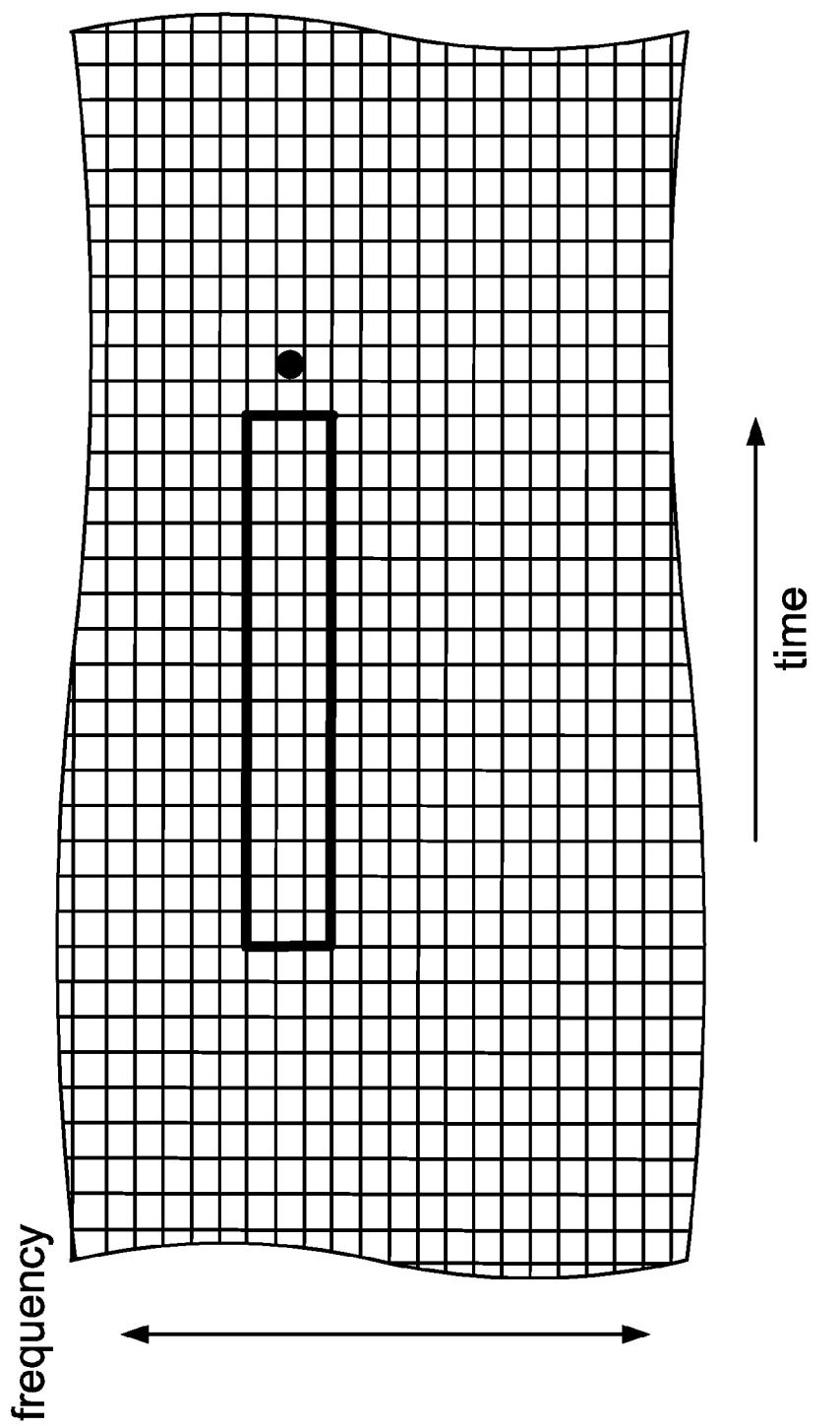
FIG. 21 is a schematic diagram showing an example of a mask as used in an implementation of a best early peak detection process in a particular implementation.

In one example, peaks up to eight chips before the peak currently selected are considered as early peak candidates. It may also be desirable to exclude peaks within one-half chip from the peak currently selected (e.g. to avoid selecting a sidelobe). FIG. 21 shows one example of a mask that may be used in an early peak search, where the circle represents the peak currently selected (e.g. the best maximum peak) and the rectangle represents the mask measuring three frequency bins by eight chips (in this example, the resolution in code phase is one-half chip). A width of the mask in frequency space may depend on an expected range of Doppler change and/or refraction effects, and in other examples the mask extends two, three, four or more frequency bins on either side of the peak currently selected. It may be desirable to accept only early peak candidates having an energy value within some value (e.g., 15 dB, 9 dB, or 6 dB) of the related maximum peak. Before a candidate best early peak is accepted as indicating the signal's location, it may be desirable to test the peak according to a cross-correlation test (e.g., task T800), a sidelobe test (e.g., task T900), and/or any of tasks T500, T600, and T700 that have not yet been performed on the peak or its bin.

In some implementations of a system, method, or apparatus as disclosed herein, one or more of the various levels L1, L2, L3 and thresholds T1, T2, T3, T4, T5, T6 may be dynamically changed based, at least in part, on one or more factors such as search window size, signal strength, total received power, and previous results. Different search modes may be used, with each mode applying a different combination of code phase search window size, bin spacing, and/or integration length. Tests may be configured according to a desired false alarm rate, and design of a particular implementation may incorporate tradeoffs between factors such as missed detections and false alarm rate, or accuracy and time-to-fix. An iteration of searches may be performed, with each search having, for example, a more narrow search window.

Figure 22:
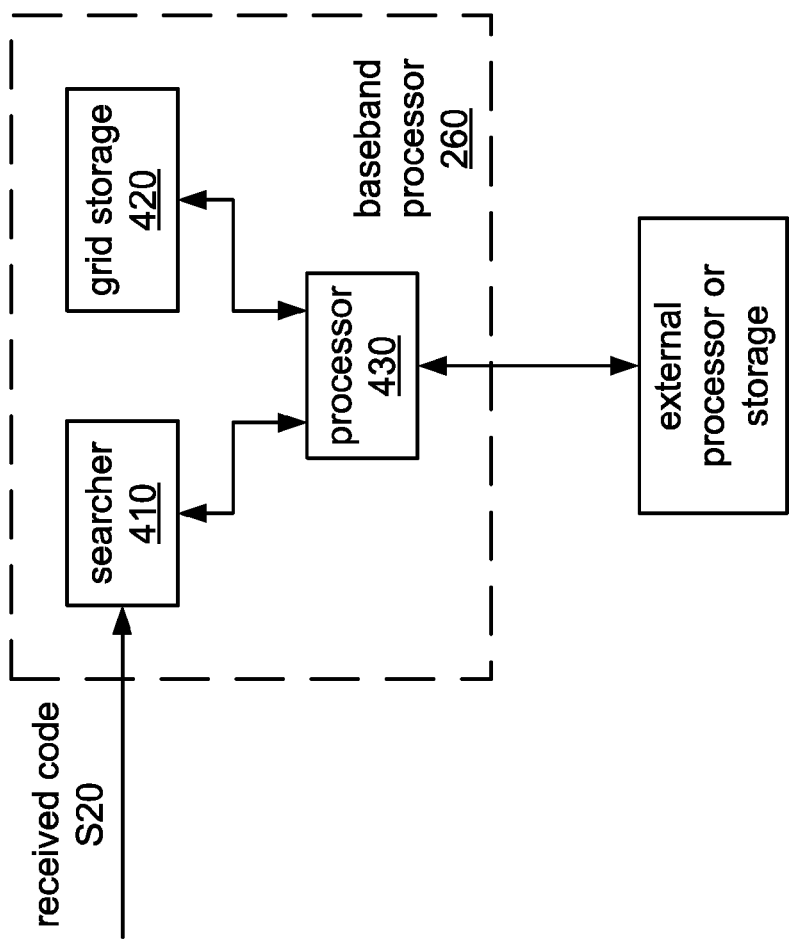
FIG. 22 is a schematic diagram of a baseband processor according to one particular implementation.

FIG. 22 is schematic diagram of a baseband processor 260 that may be configured to perform an implementation of all or a portion of process M100 as described herein. Processor 430 may control searcher 410 to obtain correlation results for a code phase search window of C code phases and D frequency hypotheses, and may obtain sorted lists of peaks for each of d bins. Grid storage 420 may be used to store some or all of correlation results (or energy results based on the correlation results). Grid storage 420 may also store instructions executed by processor 430 in performing the process M100. In this example, sorted lists may be provided to another processor for further processing (e.g. according to a best maximum peak test task and/or other tasks as described herein), although in another example, at least some further processing of the lists may be performed by processor 430. Various elements of baseband processor 260 may be implemented on the same chip (possibly with other elements, such as portions of a device for communication with a network for cellular telephony) or may be distributed across different chips or even different devices.

In a handheld and/or otherwise portable device, or in a device that is intended to operate on its own power source in a remote location, it may be desirable to design the device to reduce its power consumption. For example, it may be desirable to activate the RF circuitry to receive and sample the signal, possibly storing the sampled signal to intermediate storage, and then to power the RF circuitry down. Searcher 410 may be activated to process the received code as it is received, or may be activated to access the code from storage possibly at a later time, to obtain correlation and/or energy results. Results from searcher 410 may also be stored in an intermediate storage. Processor 430 may then be activated or interrupted from another task to process the results from searcher 410 to provide the sorted lists or further results, possibly storing this information in an intermediate storage to be accessed when another processor is activated or interrupted.

Figure 23:
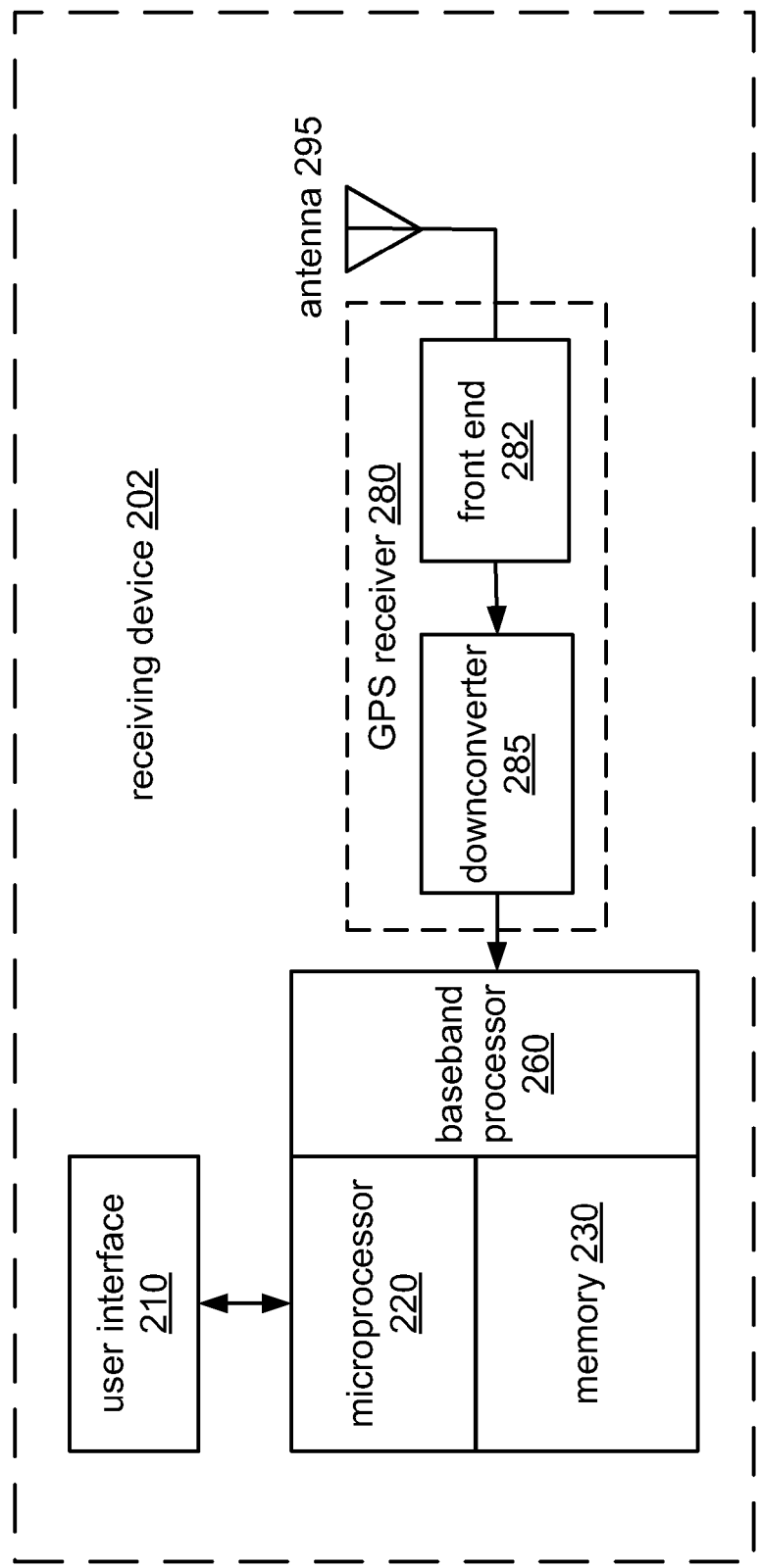
FIG. 23 is a schematic diagram of a receiver according to a particular implementation.

FIG. 23 is a schematic diagram of a receiving device 202 according to a particular embodiment. Such a device may be configured, for example, to be handheld, worn on the body (e.g. on a wristband), or vehicle-mounted. Such a device may also be configured to provide positional information, possibly in combination with Geographic Information Systems (GIS) information such as an enhanced map display. Alternatively, such a device may be configured for remote operation.

GPS receiver 280 may be adapted to receive and demodulate GPS satellite transmissions and provide the demodulated signal to a baseband processor 260. Baseband processor 260 may be adapted to derive correlation information from the demodulated signal, for example. For a given reference code, baseband processor 260 may produce a correlation function which is defined over a range of code phase hypotheses which define a code phase search window, and over a range of Doppler frequency hypotheses. An individual correlation may be performed in accordance with defined coherent and non-coherent integration parameters.

Figure 24A:
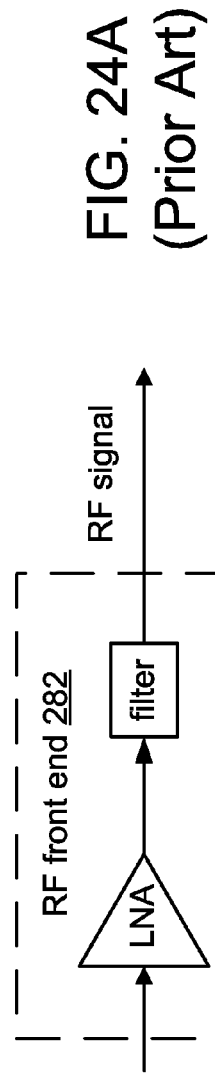
FIG. 24A is a schematic diagram of an RF front end according to particular implementations.

An RF front end 282 (FIG. 23), which typically serves to amplify and/or condition a signal received via an antenna (e.g., antenna 295), may include one or more amplifiers (such as a low-noise amplifier or LNA) and/or filters (for example, to attenuate particular frequencies or bands). An RF path may also include such elements as a diplexer (or multiplexer) to separate different frequency bands within an antenna feed. FIG. 24A shows an implementation of GPS front end 282 that includes an LNA and a filter (such as an LC, ceramic, or surface acoustic wave (SAW) filter).

Figure 24B:
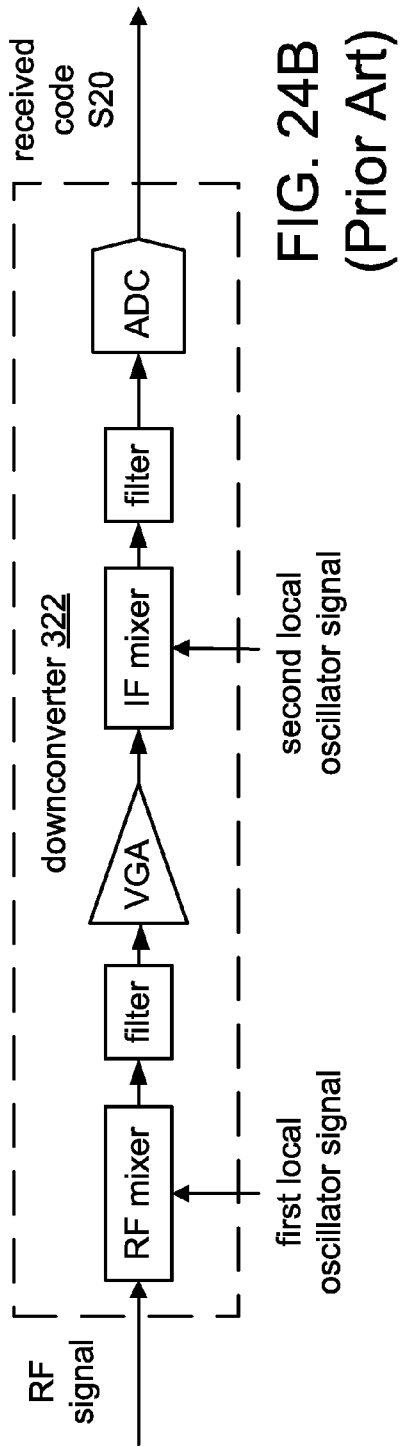
FIGS. 24B and 24C are schematic diagrams of a downconverter according to a particular implementation.

FIG. 24B is a schematic diagram of a heterodyne downconverter 322 according to a particular implementation of GPS downconverter 285. Here, downconverter 322 may receive an RF signal and transmit a complex signal at or near baseband. An RF mixer may apply a first local oscillator signal to convert the RF signal to an intermediate frequency (IF) (e.g., on the order of 10 MHz). An IF signal may be processed in an IF stage, which in this example includes a filter (e.g., to attenuate one or more images) and a variable-gain amplifier (VGA). An IF mixer may apply a second local oscillator signal to convert the IF signal to baseband. A baseband signal may be filtered (e.g. to attenuate one or more images).

An analog-to-digital converter (ADC) may convert a baseband signal from analog to a digital stream of samples. In cases where the received signal is modulated by digital information (via, e.g., PSK, QAM, MSK, and/or OOK modulation) at a particular rate (e.g. a chip rate), the ADC may over sample a baseband signal (at a rate of e.g. chip×2, chip×4, chip×8, chip×12, or chip×16 or within some range around such a rate). An ADC may also be configured to include two ADCs executing in parallel (e.g. each one receiving and digitizing a different respective component of a complex signal path of the downconverter). An ADC sampling clock may be derived from a local oscillator source such as a frequency reference signal. A sampling rate may be chosen depending on the desired search resolution in the code phase dimension and/or the desired bandwidth of the despread signal. Each component of a digital output may have a width of, for example, one, two, four, eight, or more bits. For a one-bit-wide signal, an ADC may be implemented as a comparator. A downconverter may also include an AGC stage upstream of one or more of the ADCs.

Figure 24C:
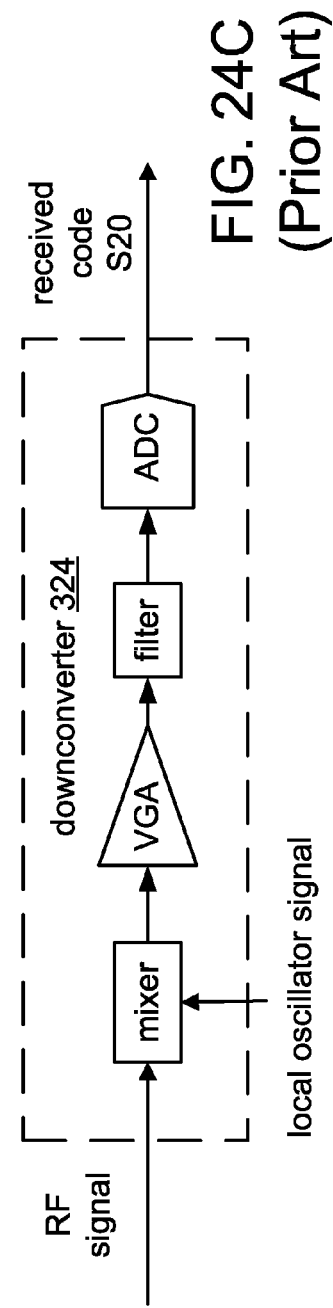

FIG. 24C is a schematic diagram of a downconverter 324 comprising a homodyne (or zero-IF) implementation according to an implementation of downconverter 285. In zero-IF conversion (also called direct downconversion), a received RF signal may be converted directly to baseband. Such a downconverter may also include circuitry for removal or compensation of a DC offset in the baseband signal. Such a downconverter may also include amplitude control of the local oscillator signal (e.g., to reduce leakage). In a related technique called near-zero IF (or very low IF or VLIF) conversion, a received RF signal may be converted directly to a near-baseband frequency that may be hundreds of kHz or lower. A VLIF downconverter may be implemented with an IF stage or without an IF stage (e.g., with the conversion from IF to baseband being performed by a phase rotation of the converted signal).

A local oscillator signal comprises a periodic signal having a fundamental frequency that may be implemented to have any waveform suitable for the particular application (e.g. sinusoidal, square, triangular, sawtooth, etc.). One or more of local oscillator signals may be obtained from a variable-frequency oscillator (VFO), which may be implemented as a crystal oscillator (or XO), a temperature-compensated oscillator (TCO), a temperature-compensated XO (TCXO), a voltage-controlled oscillator (VCO), a voltage-controlled TCO (VCTCO), or a voltage-controlled TCXO (VCTCXO). Here, a TCXO may have stability of about 1 ppm (part per million). One particular application includes a VCTCXO having a nominal output frequency of 19.68 MHz rated at +/−5 ppm. A tolerance of +/−5 ppm corresponds to a range of +/−4 kHz out of 800 MHz, or +/−9.5 kHz out of 1.9 GHz, for example.

One or more local oscillator signals applied in a downconverter may be based, at least in part, on a frequency reference signal (for example, obtained from a VFO). For example, downconverter 285 and/or device 202 may include one or more frequency synthesizers that use the frequency reference signal as a timing reference from which a signal of another frequency (e.g. a local oscillator signal) is derived. Such a synthesizer may be implemented, for example, as a frequency multiplier or divider and may include a circuit such as a phase-locked loop (PLL).

A local oscillator signal may be supplied to a mixer of a downconverter as two components separated in phase by 90 degrees (e.g. in-phase and quadrature), with each component being applied in a separate mixing path such that a complex downconverted signal is obtained. The amplitude of a local oscillator signal may be controlled by, for example, using a variable gain amplifier. A frequency reference signal (or a signal based on the frequency reference signal) may also be used as the sampling clock by which the ADC(s) sample the baseband (or near-baseband) signal.

In a particular implementation, baseband processor 260 may be adapted to perform all or a portion of process M100 to provide sorted lists to microprocessor 220 for further processing (e.g. according to a best maximum peak test task and/or other tasks as described herein), although in another example, at least some further processing of the lists may be performed by baseband processor 260. Microprocessor 220, memory 230, and baseband processor 262 260 may be implemented on the same semiconductor device or may be distributed across different devices.

Microprocessor 220 may be adapted to derive one or more time measurements (such as pseudoranges) from selected peaks using one or more techniques illustrated above. Microprocessor 220 may also be configured to determine an error (such as a root mean square error or RMSE) associated with a time measurement. Microprocessor 220 may be adapted to determine a location of device 202 based, at least in part, on selected peaks corresponding to multiple SVs.

Memory 230 may be adapted to store instructions executed by baseband processor 260 and/or microprocessor 220 in executing and/or controlling processes described and/or suggested herein. Memory 230 may also be adapted to store instructions for other operations and/or to store intermediate results of such a process and/or operation. Microprocessor 220 may be adapted to receive user commands and/or output results of such method and/or operations via user interface 210.

User interface 210 comprises a plurality of devices for receiving user commands and/or providing positional information such as coordinates on a map and/or in latitude, longitude, and/or altitude. User interface 210 may include devices such as, for example, a keypad and/or keyboard and a display screen (e.g. a liquid crystal or organic LED display).

A receiving device according to an implementation may be integrated into a communications device. Here, such a communications device may include one tuner adapted to be switched between frequencies for different tasks. In such a device, a signal sampled during a visit to an SPS frequency may be stored and processed after the tuner has tuned back to a communications (e.g., CDMA) frequency. Requirements of the communications network and/or of a desired operating performance may limit the maximum available tune-away time. Alternatively, such a device may include more than one tuner. For example, such a device may include a tuner dedicated to SPS reception and another tuner dedicated to other communications.

Figure 25:
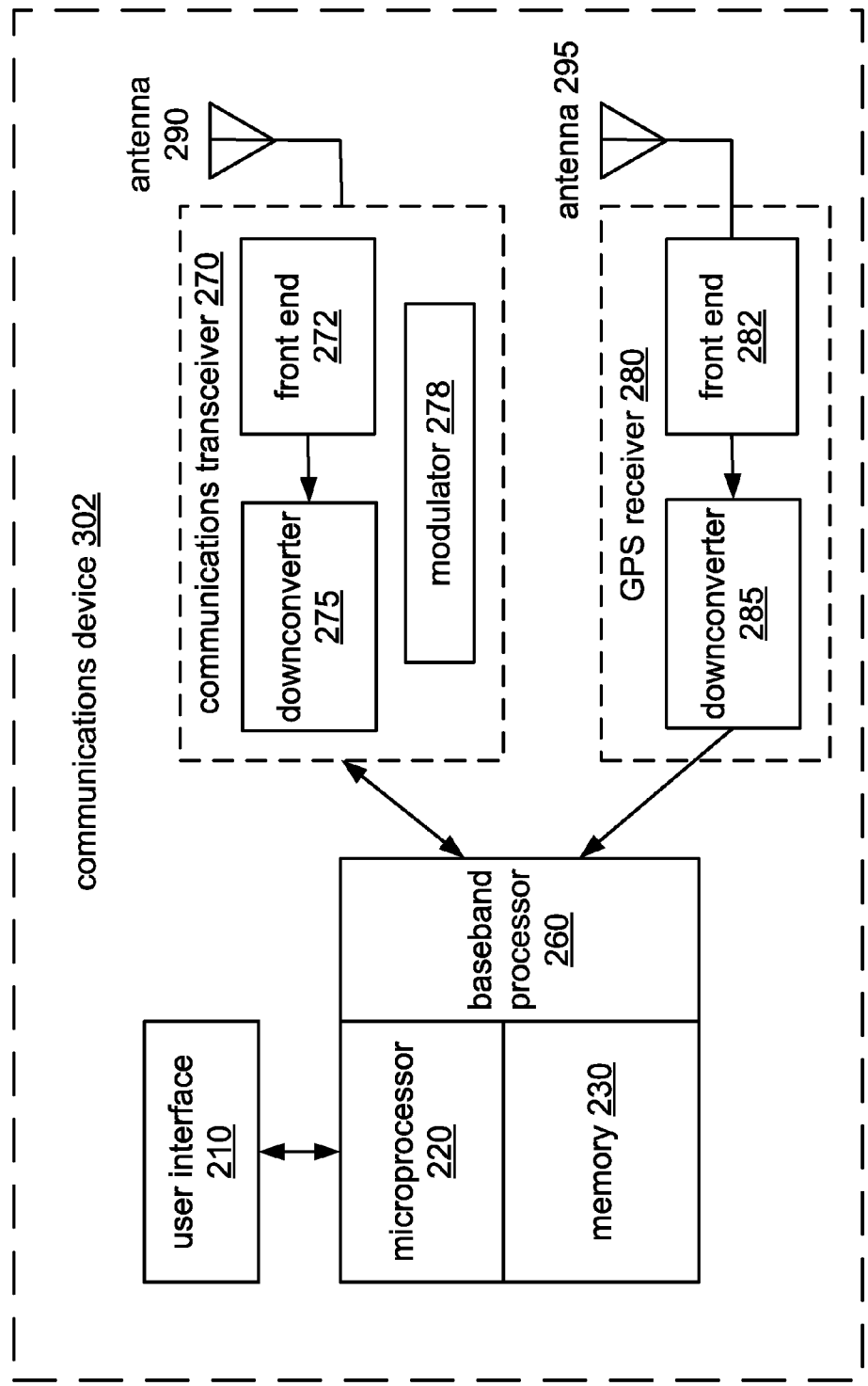
FIG. 25 is a schematic block diagram of a communications device according to a particular implementation.

FIG. 25 is a schematic block diagram of a communications device 302 according to an implementation. Such a device may include one or more elements of receiving device 202 as shown in FIG. 23, for example. Communications device 302 comprises a communications transceiver 270 including a front end 272 (which may be implemented as shown in FIG. 24A and/or as discussed above), a downconverter 275 (which may be implemented as shown in FIG. 24B or 24C and/or as discussed above), and a modulator 278 adapted to modulate information such as voice or data onto an RF carrier for transmission via antenna 290. Transceiver front end 272 may be adapted to receive a communications signal, such as a CDMA signal or other signal, for communications with a network for cellular telephony, and may also include a duplexer to support receive and transmit activity over antenna 290. In some implementations of communications device 302, portions of a front end and/or downconverter may be common to the communications and SPS signal paths.

In this device, baseband processor 260 may be adapted to provide baseband information from microprocessor 220 to transceiver 270 for transmission over a wireless communications link. In turn, microprocessor 220 may obtain this baseband information from an input device within user interface 210. Baseband processor 260 may also be adapted to provide baseband information from transceiver 270 to microprocessor 220. In turn, microprocessor 220 may provide this baseband information to an output device within user interface 210. User interface 210 may be implemented to include one or more devices for inputting or outputting user information such as voice or data. Devices included within such a user interface include a keyboard, a display screen, a microphone, and a speaker, etc. as illustrated above.

Baseband processor 260 may also be adapted to derive pilot-related correlation functions from information relating to pilot signals provided by communications transceiver 270. This information may be used by communications device 302 to acquire wireless communications services. Memory 230 may be adapted to store such instructions and/or intermediate results as are involved in executing communications operations of communications device 302.

Information received via antenna 290 may include data to support modulation wipeoff, a listing of which SVs are currently visible and their approximate code phases and Doppler values, and a command to initiate an implementation of process M100 or another process according to a particular implementation. Microprocessor 220 may be adapted to provide time measurements and errors to a PDE, which may be a network element such as a server connected to a computer network. In one example, the PDE weights each of the measurements based on the inverse of its corresponding RMSE value and estimates the position of communications device 302 based on the weighted measurements. The position calculated by the PDE may then be downloaded to device 302 so that it is available in case of a 911 or other emergency call. Other potential applications include user-requested location services, such as restaurant or ATM (automated teller machine) location, and push-oriented services such as position-dependent advertising. Communication between device 302 and a PDE may take place over a network for cellular communications.

In particular implementations, a device, such as an implementation of receiving device 202 or communications device 302, may comprise an independent unit (possibly including other elements for e.g. power management, user interface support, further processing of information received from a GPS or other receiver) or a portion of a device or system that also includes other circuits and/or functionalities.

The term "software" should be understood to include source code, assembly language code, machine code, binary code, firmware, macrocode, microcode, any one or more sets or sequences of instructions executable by an array of logic elements, and any combination of such examples.

It should be understood that a correlator as disclosed herein may be referred to as a means for correlating (e.g. a received code and a reference code), and that a processor or other array of logic elements as disclosed herein may be referred to as a means for processing (e.g. information received from storage and/or another circuit or array).

The methodologies described herein may be implemented by various means depending upon applications according to particular features and/or examples. For example, such methodologies may be implemented in hardware, firmware, software, and/or combinations thereof In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "enabling," "reducing," "associating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, process described herein, with reference to flow diagrams or otherwise, may also be executed and/or controlled, in whole or in part, by such a computing platform.

Communication techniques described herein may be implemented in various wireless communication networks such as a wireless wide area network (WWAN). The term "network" and "system" may be used interchangeably herein. A WWAN may comprise a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available.

Additionally, techniques, devices and/or processes described herein may be implemented in a navigation receiver. Such a navigation may be incorporated in any one of several devices such as, for example, a mobile station (MS), base station and/or car navigation systems. Such an MS may include a transceiver to communicate with a communication network and include a user interface. For example, such an MS may comprise any one of several devices such as, for example, a mobile phone, notebook computer, personal digital assistant, personal navigation device and/or the like.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
   processing a received satellite positioning system (SPS) signal to obtain a correlation peak detection in a code phase search window comprising a range of code phase hypotheses;
   detecting two or more energy peaks in the processed SPS signal; and
   altering the processing in response to detecting energy peaks spaced apart by more than a set spacing in the range of code phase hypotheses.

2. The method of claim 1, wherein the set spacing is based, at least in part, on a maximum spacing of an energy peak from detection of a later multipath signal and an energy peak resulting from detection of a multipath signal.

3. The method of claim 1, wherein the altering the processing further comprises extending an integration time to allow detection of additional energy peaks in the code phase search window.

4. The method of claim 3, wherein the extending the integration time comprises suspending early termination of integration to obtain an energy result.

5. A mobile station comprising:
   a receiver adapted to receive and downconvert a satellite positioning system (SPS) signal; and
   a baseband processor, the baseband processor being adapted to:
   process the downconverted SPS signal to detect a correlation peak in a code phase search window, the code phase search window comprising a range of code phase hypotheses;
   detect two or more energy peaks in the processed SPS signal; and
   alter the processing of the downconverted SPS signal in response to detecting the energy peaks spaced apart by more than a set spacing in the range of code phase hypotheses bins.

6. The mobile station of claim 5, wherein the set spacing is based, at least in part, on a maximum spacing of an energy peak from a true code phase detection and a peak resulting from detection of a multipath signal.

7. The mobile station of claim 5, wherein the baseband processor is adapted to alter the processing in response to the detecting by extending an integration time to detect additional energy peaks in the code phase search window.

8. The mobile station of claim 7, wherein the extending the integration time comprises suspending early termination of integration to obtain an energy result.

9. An article comprising:
   a non-transitory storage medium having machine readable instructions stored thereon executable by a computing platform to:
   control processing of a downconverted satellite positioning system (SPS) signal to detect a correlation peak in a code phase search window comprising a range of code phase hypotheses;
   detect two or more energy peaks in the processed SPS signal; and
   alter the processing of the downconverted SPS signal in response to detecting energy peaks spaced apart by more than a set spacing in the range of code phase hypotheses.

10. The article of claim 9, wherein the set spacing is based, at least in part, on a maximum spacing of an energy peak from a true code phase detection and a peak resulting from detection of a multipath signal.

11. The article of claim 9, wherein the instructions to alter the processing of the downconverted SPS signal in response to detecting energy peaks spaced apart by more than a set spacing in the range of code phase hypotheses further comprise instructions to extend an integration time to detect additional energy peaks in the code phase search window.

12. The article of claim 11, wherein the instructions to extend the integration time comprise instructions to suspend early termination of integration to obtain an energy result.

13. An apparatus comprising:
- means for processing a received satellite positioning system (SPS) signal to detect a correlation peak in a code phase search window comprising a range of code phase bins associated with code phase hypotheses;
- means for detecting two or more energy peaks in the processed SPS signal; and
- means for altering the processing in response to detecting energy peaks spaced apart by more than a set spacing in the range of code phase bins.

14. The apparatus of claim 13, wherein the set spacing is based, at least in part, on a maximum spacing of an energy peak resulting from detection of a later multipath and a peak resulting from detection of a multipath signal.

15. The apparatus of claim 13, wherein the means for altering the processing further comprises means for extending an integration time to allow detection of additional energy peaks in the code phase search window.

16. The apparatus of claim 15, wherein the means for extending the integration time comprises suspending early termination of integration to obtain an energy result.

* * * * *